United States Patent [19]

Stoller

[11] Patent Number: 5,740,427
[45] Date of Patent: Apr. 14, 1998

[54] MODULAR AUTOMATED ACCOUNT MAINTENANCE SYSTEM

[76] Inventor: Lincoln Stoller, 148 DuBois Rd., Shokan, N.Y. 12481

[21] Appl. No.: 365,940

[22] Filed: Dec. 29, 1994

[51] Int. Cl.⁶ .................................................. G06F 17/30
[52] U.S. Cl. ........................................................ 395/615
[58] Field of Search ..................................... 395/615, 230

[56] References Cited

U.S. PATENT DOCUMENTS

| | | | |
|---|---|---|---|
| 4,636,947 | 1/1987 | Ward | 395/671 |
| 4,642,767 | 2/1987 | Lerner | 364/406 |
| 4,843,548 | 6/1989 | Carpenter | 364/406 |
| 4,918,593 | 4/1990 | Huber | 364/200 |
| 4,933,842 | 6/1990 | Durbin et al. | 395/230 |
| 5,115,504 | 5/1992 | Belove et al. | 395/600 |
| 5,117,356 | 5/1992 | Marks | 364/406 |
| 5,193,055 | 3/1993 | Brown et al. | 364/406 |
| 5,201,046 | 4/1993 | Goldberg et al. | 395/600 |
| 5,202,984 | 4/1993 | Kashio | 395/600 |
| 5,226,158 | 7/1993 | Horn et al. | 395/600 |
| 5,227,967 | 7/1993 | Bailey | 364/408 |
| 5,262,942 | 11/1993 | Earle | 395/237 |
| 5,283,895 | 2/1994 | Kashio | 395/600 |
| 5,317,504 | 5/1994 | Nakayama | 364/406 |
| 5,371,680 | 12/1994 | Anno et al. | 395/230 |
| 5,390,113 | 2/1995 | Sampson | 395/230 |
| 5,608,874 | 3/1997 | Ogawa et al. | 395/200 |
| 5,644,118 | 7/1997 | Hayashida | 235/379 |

*Primary Examiner*—Wayne Amsbury
*Attorney, Agent, or Firm*—Felsman, Bradley, Gunter & Dillon, L.L.P.

[57] ABSTRACT

A method and data processing system for processing various transactions, accounts, and journals. Data is received by the dam processing system, wherein the data includes data that is specific to accounting processes. A first portion of the data is identified as core data, wherein this first portion contains data specific to accounting processes. The second portion of the data is identified as auxiliary data. The core data and auxiliary data are stored in different files. Links are established between the various types of data. The stored data may be retrieved by a number of different processes, but core data may be modified only by accounting processes.

15 Claims, 21 Drawing Sheets

Cash  Journal  Transaction  History  ~1900

| Date | Title | Account | $ Amount |
|---|---|---|---|
| 2/25/95 | Wage paid | Payroll Cash | -700.00 |
| 3/1/95 | Contract Sale | MegaBank Checking | 850.00 |
| 3/5/95 | Consulting | MegaBank Checking | 450.00 |

Income  Journal  Transaction  History  ~1902

| Date | Title | Account | $ Amount |
|---|---|---|---|
| 3/1/95 | Contract Sale | Service Contract | 850.00 |
| 3/5/95 | Consulting | Consulting Income | 450.00 |

Expense  Journal  Transaction  History  ~1904

| Date | Title | Account | $ Amount |
|---|---|---|---|
| 2/25/95 | Wage paid | Wage Expense | 700.00 |

Fig. 19

MODULAR AUTOMATED ACCOUNT MAINTENANCE SYSTEM

BACKGROUND OF THE INVENTION

1. Technical Field

The present invention relates to a modifiable computer accounting apparatus that can be configured to process different kinds of accounting transactions, accounts, and journals as are appropriate to different business specialties. More particularly, the present invention relates to a method and apparatus for separating generic aspects of bookkeeping common between different types of businesses from those aspects of bookkeeping that are unique to different types of businesses.

2. Description of the Related Art

The present invention concerns the management of accounting transactions. An accounting transaction, or transaction for short, is a record of a number of debits and credits that represent the movement of assets between accounts. In a conventional data processing system for transaction processing, different database files, also referred to as "tables", are used to store the contents of different types of transactions. These transactions are stored in the files as records whose items of information are stored in fields. Records are also referred to as "rows", and fields are also referred at as "columns".

The transactions stored in this manner refer in turn to various auxiliary files, a different auxiliary file as is relevant to each type of transaction. FIG. 1 shows a series of representative transaction files invoice 10, purchase order 12, and loan 14 that are related to the auxiliary files customer 16, vendor 18, and lender 20.

Further, each type of transaction is entered through a specific journal which serves to centralize related information and modularize the system according to task. These different journals includes sales journal transaction 22, purchases journal transaction 24, and receipts and disbursements journal transaction 26.

When transactions are recorded, programs specific to each of the journals are executed to update the respective transaction files. These update programs, update sales 28, update purchases 30, and update loans 32 in FIG. 1, must be designed and tested separately. When reports are needed, separate programs review sales 34, review purchases 36, and review deposits 38 review the collected data and print separate reports for each file. Reports can collect data from unrelated files but this more difficult and therefore is done much less frequently.

Conventional data processing systems for processing transactions often simulate the operations of the manual systems they are designed to replace. A common methodology is to automate forms processing. This approach is taken because most or all information entered into the data processing system was done through one form or another. Such form based systems are quite limited in the range of modifications that they can support without being extensively redesigned. Form based design is inflexible because it is an architecture based on special cases rather than basic concepts.

For example, a business dealing exclusively with customers and vendors might be well served by software designed around customer and vendor files, as shown in FIG. 1. But it would be difficult to use this structure to serve the needs of a distributorship since such a business both sells and repurchases from the same individuals. It would be similarly ill suited to handle information pertaining to an equipment leasing operation whose trade involves both suppliers and purchasers of equipment and suppliers and purchasers of leases.

In conventional systems, generic methods and processes are deeply embedded in particular methods and processes. As a result, it is quite difficult to modify systems designed for one type of business to satisfy the needs of another type of business.

More specifically, when an engineer designs a software system to meet needs unique to a particular type of business he or she must create various transaction management and reporting programs. This requires a lengthy task of writing a complex data management and accounting system, usually written from scratch or extensively modified from preexisting programs. While many such software systems contain components particular to specific business, these systems also share many components common to general accounting.

The creation of large programs requires extensive testing, debugging, and documentation. The programs produced are often difficult to maintain over time and are neither easily understood nor easily modified by programmers other than the original authors. In an attempt to lower costs and expedite development, software systems are frequently developed that are so complex that users must continually rely on specialists for instructing and for maintaining these systems.

In addition to being expensive, custom software systems have been plagued by a high failure rate. Well over half of custom written systems have either remained unfinished, uninstalled, or unused.

One way to make custom systems more affordable is to design them so that parts of them can be used in the assembly of other systems with other purposes. Reusable software is designed to perform general tasks with little programming effort, while also supporting easy modification of the code to handle more specific tasks.

SUMMARY OF THE INVENTION

A first object of the present invention is to provide a method and system which can facilitate an accounting system design for processing transactions that can be divided into a core and auxiliary parts.

A second object of the present invention is to provide a method and system which can facilitate an accounting system design for processing accounts that can be divided into a core and auxiliary parts.

A third object of the present invention is to provide an improved method for reporting account activity. This method is based on a grouping of accounts according to journals and it draws on core account and core transaction information.

According to the present invention, a data processing system for transaction processing is provided for updating transaction records in accordance with the specific type of transactions. This data processing system includes a transaction input and user interface means for entering and temporarily storing transaction information.

The data processing system also includes a transaction control means that retrieves and increments a unique transaction sequence number from a permanent storage location, assigns core transaction heading and core transaction component information to a permanent storage location, activates and passes transaction information to an auxiliary transaction control means, and activates and passes transaction information to an update accounts means.

The aforementioned core transaction heading file serves to store information that is independent from the core and auxiliary accounts. The aforementioned core transaction component file serves to store information that is dependent upon core accounts.

The aforementioned auxiliary transaction control means creates a permanent record of auxiliary transaction information, as dictated by the type of transaction, that includes the core transaction sequence number. Examples of possible auxiliary transaction information include invoices, purchase orders, and cash sales.

The aforementioned update accounts means retrieves pre-existing core account records or creates new core account records and updates core accounts information.

The update accounts means also activates and passes transaction information to an update auxiliary accounts means which locates and modifies the information in at most one auxiliary account for each of the core accounts affected by the transaction.

The core and auxiliary transaction information may include items such as monetary amounts, dates, references to business and accounting entities, tax rates, and the like. In addition, core and auxiliary transaction information include whatever information is required to reassemble the transaction from its core and auxiliary parts.

According to the present invention, a data processing system for account records is provided for updating records in accordance with the specific type of accounts. This data processing system includes an account input and user interfaces means for entering and temporarily storing account information.

It also includes an account control means that retrieves and increments a unique account sequence number from a permanent storage location, retrieves a unique journal identification code from a permanent storage location, assigns core account information to a permanent storage location, and activates and passes account information to an auxiliary account control means.

The aforementioned auxiliary account control means creates a permanent record of auxiliary account information, as dictated by the type of account, that includes the core account sequence number. Examples of possible auxiliary account information include, for example, customers, vendors, and lessors.

To achieve the third object, according to the present invention, a data processing system for journal report processing is provided for retrieving information from the files in accordance with the specifications requested.

This data processing system includes report specification user interface means for entering and temporarily storing report specification information.

It also includes a report generating means that retrieves information from a specified journal, from some of the core accounts related to the specified journal, from some of the core transaction components related to these core accounts, and from all of the core transaction headings related to theses core transaction components. The report generating means constructs a report from the retrieved information according to the report specifications and sends it to a display or storage device, such as a monitor or a printer.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 19 shows a sample form of printed journal reports in accordance with a preferred embodiment of the present invention.

DETAILED DESCRIPTION OF PREFERRED EMBODIMENT

Figure 1:
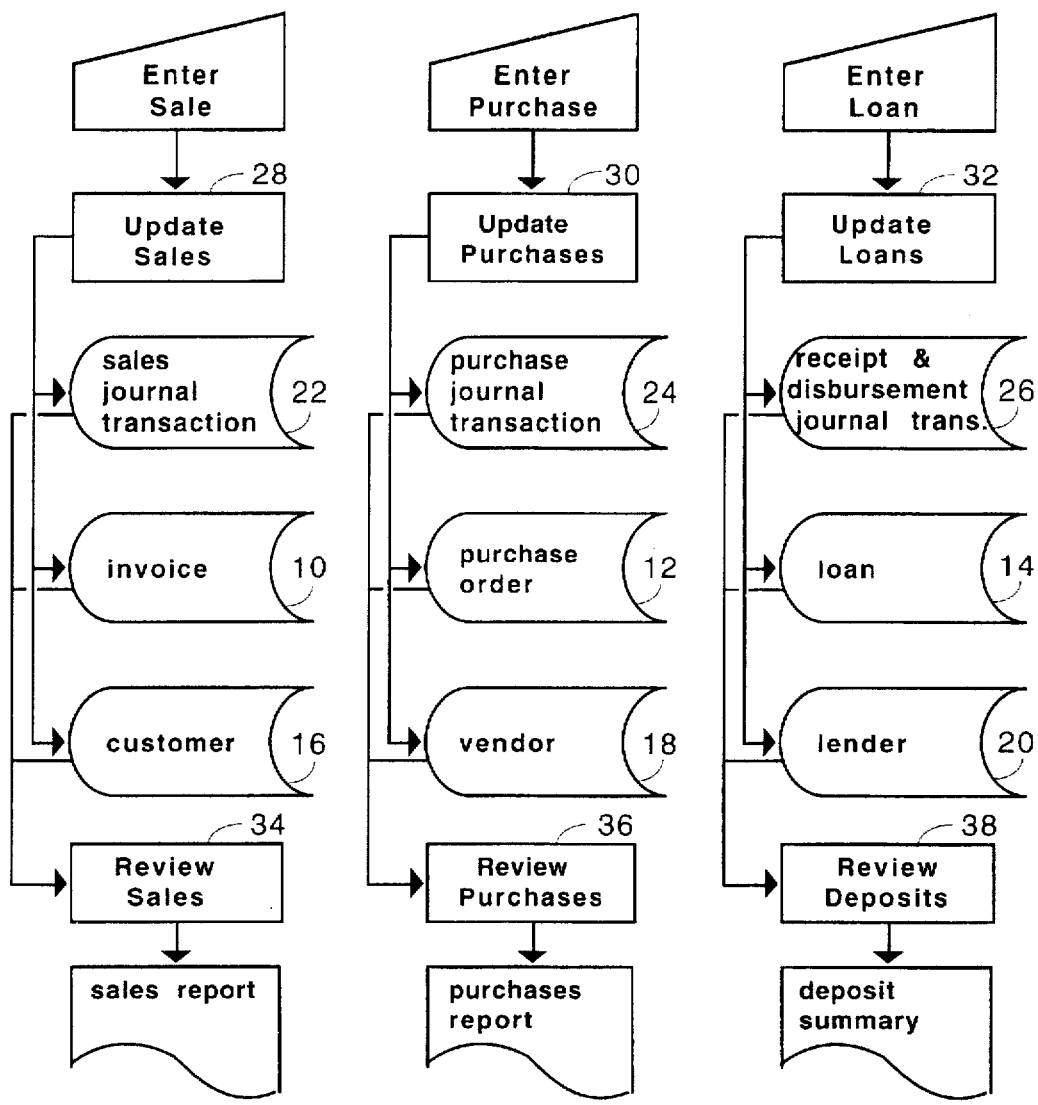
FIG. 1 is a data flow diagram of a conventional transaction processing system where different files are employed to store different types of transactions.
Figure 2A:
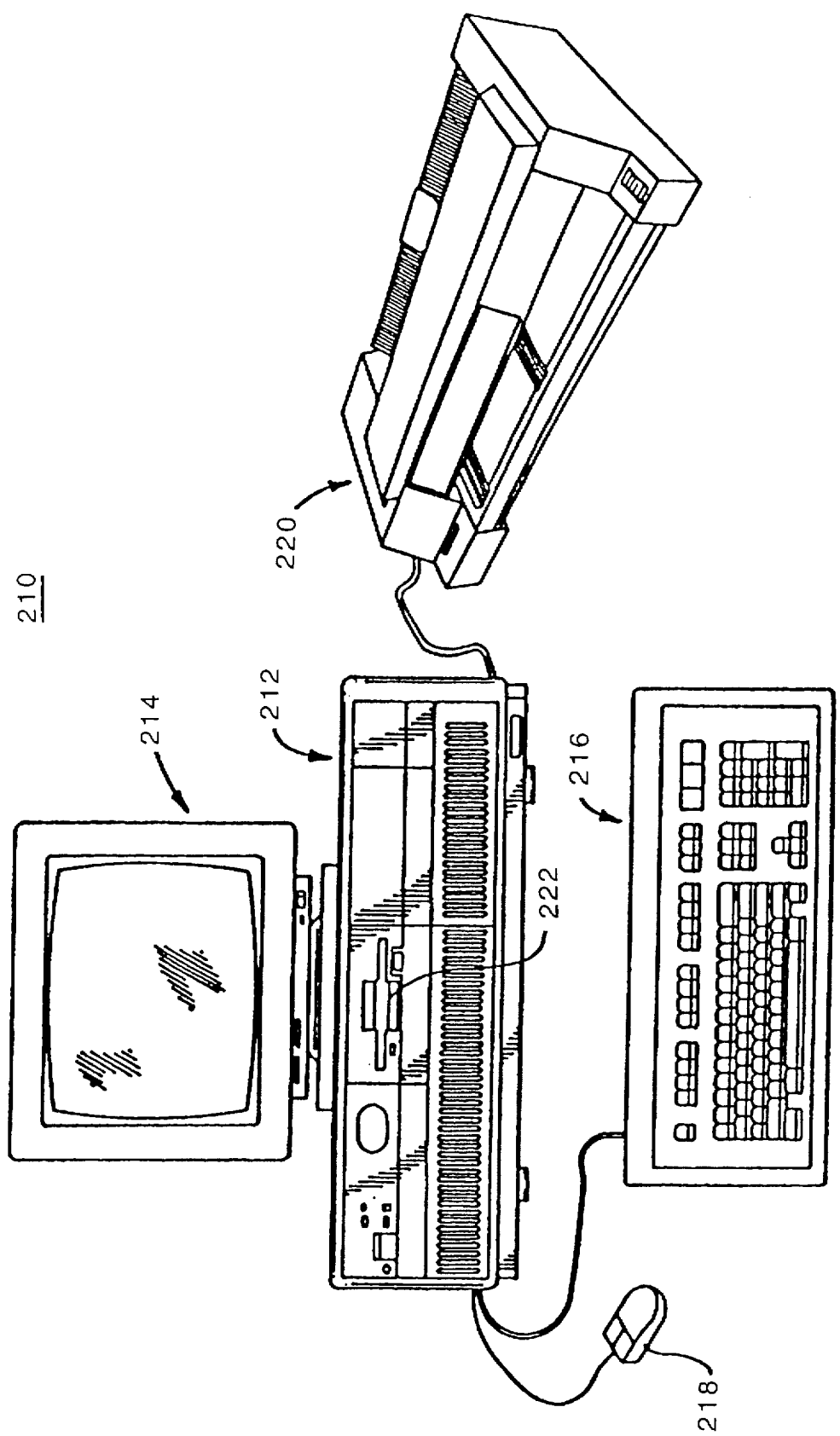
FIG. 2A is a data processing system in the form of a personal computer in which the present invention can be employed is depicted.

Referring now to the figures, and in particular to FIG. 2A, a data processing system, personal computer system 210, in which the present invention can be employed is depicted. As shown, personal computer system 210 comprises a number of components, which are interconnected together. More particularly, a system unit 212 is coupled to and can drive an optional monitor 214 (such as a conventional video display). A system unit 212 also can be optionally coupled to input devices such as a PC keyboard 216 or a mouse 218. An optional output device, such as a printer 220, also can be connected to the system unit 212. Finally, system unit 212 may include one or more mass storage devices such as the diskette drive 222.

As will be described below, the system unit 212 responds to input devices, such as PC keyboard 216, the mouse 218, or local area networking interfaces. Additionally, input/output (I/O) devices, such as floppy diskette drive 222, display 214, printer 220, and local area network communication system are connected to system unit 212 in a manner well known. Of course, those skilled in the art are aware that other conventional components also can be connected to the system unit 212 for interaction therewith. In accordance with the present invention, personal computer system 210 includes a system processor that is interconnected to a random access memory (RAM), a read only memory (ROM), and a plurality of I/O devices.

In normal use, personal computer system 210 can be designed to give independent computing power to a small group of users as a server or a single user and is inexpensively priced for purchase by individuals or small businesses. In operation, the system processor functions under an operating system, such as IBM's OS/2 operating system, Apple Computer Corporation's Mac OS or DOS. OS/2 is a registered trademark of International Business Machines Corporation. "Mac OS" is a registered trademark of Apple Computer Corporation.

Figure 2B:
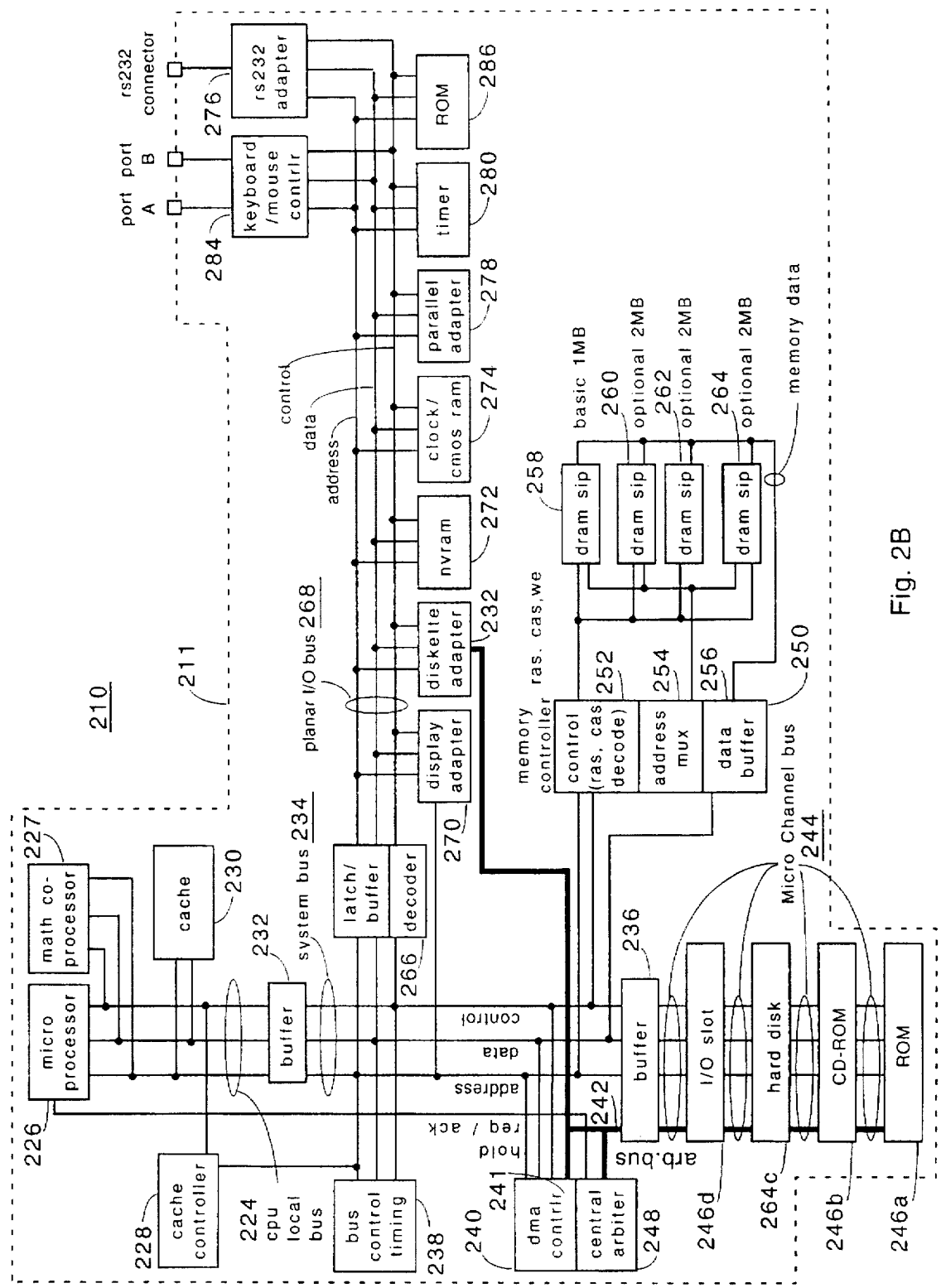
FIG. 2B is a block diagram of a personal computer system illustrating the various components of personal computer system in accordance with the present invention.

Prior to relating the above structure to the present invention, a summary of the operation in general of personal computer system 210 may merit review. Referring to FIG. 2B, there is shown a block diagram of personal computer system 210 illustrating the various components of personal computer system 210 in accordance with the present invention. FIG. 2B further illustrates components of motherboard 211 and the connection of motherboard 211 to I/O slots 246a–246d and other hardware of personal computer system 210. Connected to motherboard 211 is the system central processing unit (CPU) 226 comprised of a microprocessor which is connected by a high speed CPU local bus 224 through a bus controlled timing unit 238 to a memory control unit 250 which is further connected to a volatile random access memory (RAM) 258.

While the present invention is described hereinafter with particular reference to the system block diagram of FIG. 2B, it is to be understood at the outset of the description which follows, it is contemplated that the apparatus and methods in accordance with the present invention may be used with other hardware configurations of the motherboard. For example, the system processor could be an Intel, IBM, or Motorola microprocessor. These particular microprocessors can operate in a real addressing mode or a protected addressing mode. Each mode provides an addressing scheme for accessing different areas of the microprocessor's memory.

Returning now to FIG. 2B, CPU local bus 224 (comprising data, address and control components) provides for the connection of CPU 226, an optional math coprocessor 227, a cache controller 228, and a cache memory 230. Also coupled on CPU local bus 224 is a buffer 232. Buffer 232 is itself connected to a slower speed (compared to the CPU local bus) system bus 234, also comprising address, data and control components. System bus 234 extends between buffer 232 and a further buffer 236. System bus 234 is further connected to a bus control and timing unit 238 and a Direct Memory Access (DMA) unit 240. DMA unit 240 is comprised of a central arbitration unit 248 and a DMA controller 241. Buffer 236 provides an interface between the system bus 234 and an optional feature bus such as the Micro Channel bus 244, SCSI bus, NuBus, or PCI bus. "Micro Channel" is a registered trademark of International Business Machines Corporation. "NuBus" is a registered trademark of Apple Computer Corporation. Connected to bus 244 are a plurality of I/O slots 246a–246d for receiving adapter cards which may be further connected to an I/O device or memory. In the depicted example, I/O slot 246a has a hard disk drive connected to it; I/O slot 246b has a CD-ROM drive connected to it; and I/O slot 246c has a ROM on an adapter card connected to it. Other devices, such as a modem may be connected to an I/O slot. An arbitration control bus 242 couples the DMA controller 241 and central arbitration unit 248 to I/O slots 246 and diskette adapter 282. Also connected to system bus 234 is a memory control unit 250 which is comprised of a memory controller 252, an address multiplexer 254, and a data buffer 256. Memory control unit 250 is further connected to a random access memory as represented by RAM module 258. Memory controller 252 includes the logic for mapping addresses to and from CPU 226 to particular areas of RAM 258. While the personal computer system 210 is shown with a basic 4 megabyte RAM module, it is understood that additional memory can be interconnected as represented in FIG. 2B by the optional memory modules 260 through 264.

A further buffer 266 is coupled between system bus 234 and a motherboard I/O bus 268. Motherboard I/O bus 268 includes address, data, and control components respectively. Coupled along motherboard bus 268 are a variety of I/O adapters and other peripheral components such as display adapter 270 (which is used to drive an optional display 214), a clock 272, nonvolatile RAM 274 (hereinafter referred to as "NVRAM"), a RS232 adapter 276, a parallel adapter 278, a plurality of timers 280, a diskette adapter 282, a PC keyboard/mouse controller 284, and a read only memory (ROM) 286. The ROM 286 includes Basic Input/Output System which provides the user transparent communications between many I/O devices.

Clock 272 is used for time of day calculations. NVRAM 274 is used to store system configuration data. That is, the NVRAM will contain values which describe the present configuration of the system. For example, NVRAM 274 contains information which describe the capacity of a fixed disk or diskette, the type of display, the amount of memory, etc. Of particular importance, NVRAM 274 will contain data which is used to describe the system console configuration; i.e., whether a PC keyboard is connected to the keyboard/mouse controller 284, a display controller is available or the ASCII terminal is connected to RS232 adapter 276. Furthermore, these data are stored in NVRAM 274 whenever a special configuration program is executed. The purpose of the configuration program is to store values characterizing the configuration of this system to NVRAM 276 which are saved when power is removed from the system.

Connected to keyboard/mouse controller 284 are ports A and B. These ports are used to connect a PC keyboard (as opposed to an ASCII terminal) and mouse to the PC system. Coupled to RS232 adapter unit 276 is an RS232 connector. An optional ASCII terminal can be coupled to the system through this connector.

Specifically, personal computer system 210 may be implemented utilizing any suitable computer such as the IBM personal computer, Apple Macintosh computer, or Sun workstation, to name a few.

Figure 3:
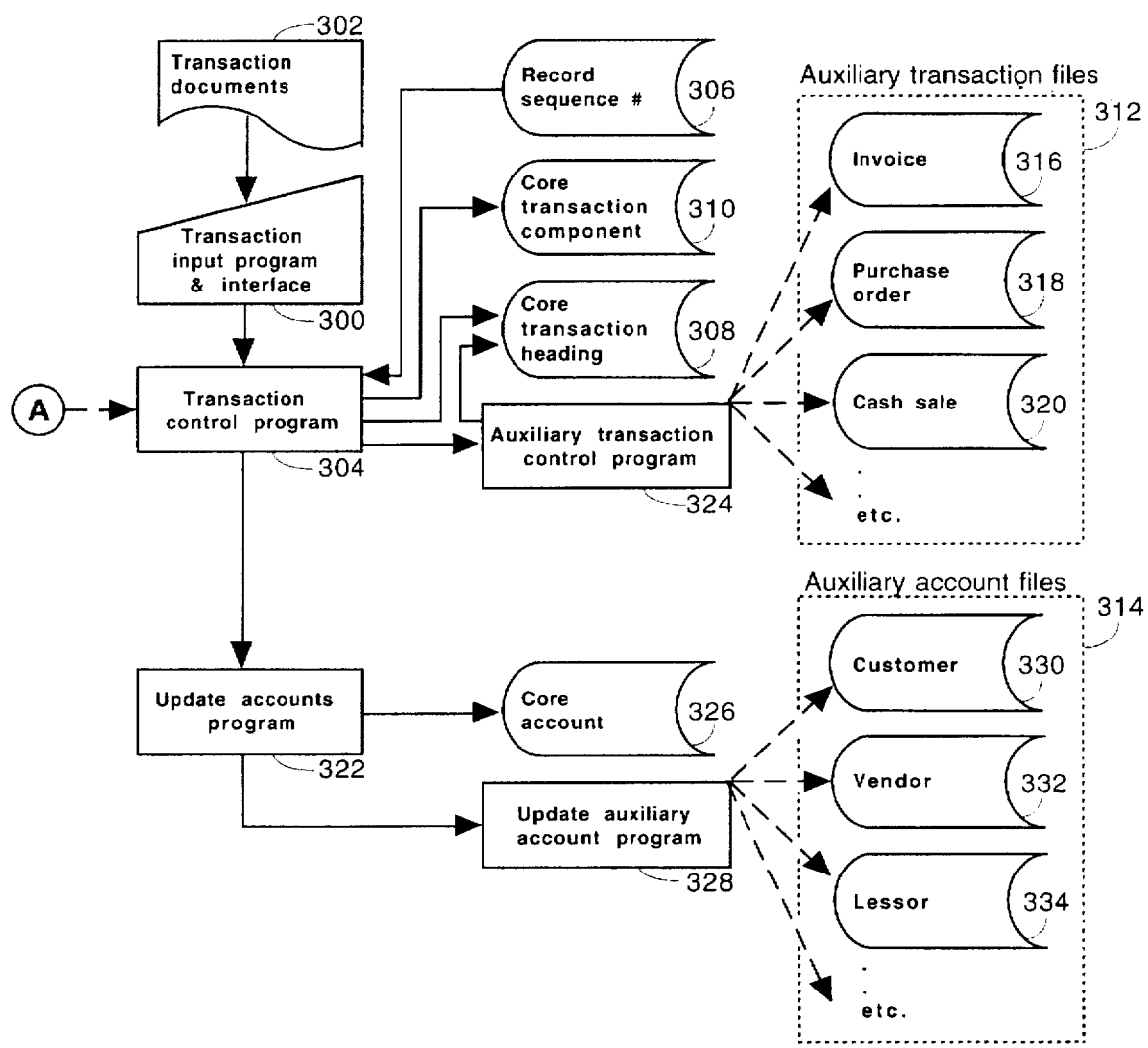
FIG. 3 is a data flow diagram of a transaction processing apparatus in accordance with a preferred embodiment of the present invention.

FIG. 3 shows an arrangement of transaction processing components in a data processing system for account processing for a wide variety of transaction types in accordance with a preferred embodiment of the present invention. In FIG. 3, an interface means, transaction input program and interface 300, enables the user to enter one of a number of predetermined types of transactions. Such transactions could include invoices, purchase orders, payroll disbursements, cash deposits or withdrawals, depreciation of assets, recurring payments, among many others. In general, any data that is particular to a specific type of transfer of assets can be treated as a different type of transaction.

The user chooses that type of transaction dictated by the information collected on transaction documents 302. The user enters transaction information required for the type of transaction chosen. This may include specifying various core accounts and auxiliary accounts, dates, amounts, and the like. The information entered is stored in memory until the entry is complete, according to predetermined rules, and the user directs the data processing system to accept the transaction into permanent storage.

Transaction control program 304 is activated to carry out the transaction control process once the data processing system verifies that the entered information is complete and consistent for the given type of transaction. Verification is performed both in the transaction input program and in the transaction control program. For example, the input program may check that the user has entered a valid date, while the transaction control program may scan existing data to check whether any existing transactions store exactly the same information.

A transaction accepted for processing must specify a minimum amount of core transaction information and account information. A transaction consists of a set of components that record debits and credits to different accounts. Each component may store information specific to the particular account being debited or credited, such as a text description if the physical items or conditions involved. In addition to the component information, a transaction also records general information, applicable to all of its components, which includes such items as the date of entry, the name of the user entering the data, an unique ID number used to tie the components together, a user-defined reference code, a text description, and so on. It may also be required to specify auxiliary transaction information depending on what type of transaction is entered.

Auxiliary transaction information could include a Bill of Lading number for invoices, clearing house reference for financial transactions, due dates for payment obligations, among many others. The core transaction lists the accounts involved in the transaction and the amount debited and credited to each account. The debit and credit elements listed in a core transaction are called "transaction components". This list of components is constructed using unique labels that distinguish every account. As a result, every element listed in the core transaction refers to exactly one account. Transaction components are assembled with reference to core information about each account, which includes the type of account (asset, liability, etc.), various reference numbers that may be attached to the account, as well as other information. For example an input program for sales transactions may allow the user to distribute the sales revenue to any income-type account. In order to verify that the user distributed the revenue to an account of the correct type, the input program would have to determine that account's type by referring to information stored in the core accounts file.

In addition to the components, each transaction includes a heading that binds the components together. This heading identifies common items such as the date of entry, the name of the person entering the information, and reference codes. At a minimum, the heading contains a unique marker to distinguish it from other transactions, and an entry date. Furthermore, the heading includes a mechanism for linking additional auxiliary information. Auxiliary information is information that is not part of the core transaction and is not required for accounting processes in the data processing system.

Additional information that is business-specific and not necessary to general accounting processes can be accessed by extensions to the core transaction information. These extensions also may include components for performing tasks unrelated to accounting processes, such as personnel management, laboratory analysis, or document retrieval. These auxiliary extensions, however, are limited in that the information they contain may not replace, render incorrect, or be in conflict with core information utilized by the accounting processes in accordance with the preferred embodiment of the present invention. Information that may be added as auxiliary information to core transaction data include, for example, invoices, purchase orders, point-of-sale transactions, return merchandise authorizations, loan documents, or lease agreements. In fact, any information contained on any contract or document with financial ramifications may be added or linked to a core transaction in accordance with a preferred embodiment of the present invention. The processes and data structures utilized in accordance with a preferred embodiment of the present invention for core transactions and auxiliary transaction information are described in more detail below.

The transaction control process increments the entry sequence number from the record sequence file 306, organizes the entry into the form of records to be stored in the core transaction heading 308, core transaction component 310, auxiliary transaction files 312, and auxiliary account files 314. The transaction control process also locates permanent storage and assigns core transaction information to that space, and then passes transaction information to the auxiliary transaction control program, and to the update accounts program.

Figure 4:
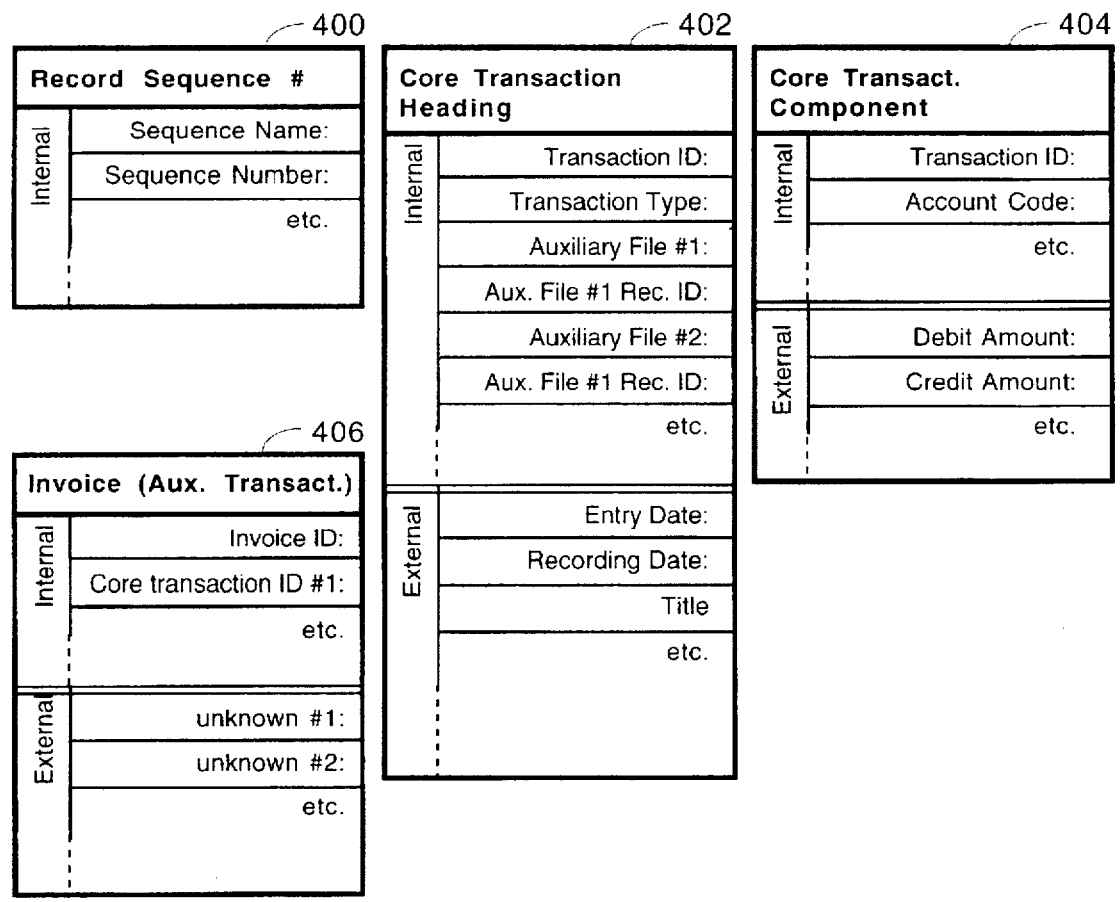
FIG. 4 is a data structure diagram of the record sequence number and transaction files in accordance with a preferred embodiment of the present invention.

The record sequence number, core transaction heading, and core transaction component files are each comprised of a series of relocatable records whose data structure is shown in FIG. 4. Record sequence number record 400, core transaction heading record 402, core transaction component record 404, and auxiliary transaction record 406 are examples of relocatable records in accordance with a preferred embodiment of the present invention.

The data structure of these records is divided into internal data reserved for system use for storing and relocating the record, and external data representing information entered from the transaction documents.

Each record 400 in sequence number file 306 stores the name of a sequence and the sequence number available to be assigned to the next record in that sequence, as shown in FIG. 4. The sequence name identifies which set of sequence-bearing records a given sequence number applies to. For example, the next available transaction sequence number would be stored in a sequence record with the sequence name of "transaction". A sequence record with the name "core-account" would store the next available core account sequence number, and so on. Records such as sequence number record 400 are only accessed and modified by the data processing system. These records are created and assigned initial values before data is entered into the data processing system. Sequence number file 400 includes a sequence number record for a transaction.

Each core transaction heading record 402 in core transaction heading file 308 stores as its internal data an unique sequence number, referred to hereafter as the "transaction ID", and the type of the transaction as specified through the interface means. The relation between the core transaction information and the auxiliary transaction information must be supported through one or more possible means. One such means is illustrated in core transaction heading record in a core transaction heading file where the heading file reserves places to store numbers that identify one or more auxiliary files, as well as the ID numbers distinguishing records in these auxiliary files. The appearance of multiple items labeled "Auxiliary File #1", "Auxiliary File #2", etc. emphasizes that there can be more than one auxiliary file and record related to a single core transaction.

The external information stored in core transaction heading record 402 consists of that information that does not affect any account and is common to all types of transactions. This information may include, for example, the date the information was entered into the data processing system, the date recorded on the transaction documents, and an identifying title assigned by the user.

Each record in the core transaction component file 310 stores as its internal data the aforementioned transaction ID. Its external information consists of that information that does affect any account and is common to all types of transactions. Such information includes an unique code that distinguishes this account, the value asset affecting this account, whether it is a debit or a credit, and other possible data. This record structure is shown in FIG. 4 as core transaction component record 404.

Each auxiliary transaction record 406 in each of the auxiliary transaction files 312 may store the aforementioned transaction ID in one of its internal data fields. Auxiliary transaction files 312 in the depicted example includes invoice 316, purchase order 318, and cash sale 320. Depending on which of various means is used to establish the relation between the auxiliary and core transaction records, a given auxiliary transaction record may or may not need to store the aforementioned transaction ID. If the auxiliary transaction record can be created and stored before the core transaction is created, then it will have a field for an unique identifier necessary to distinguish it from other records in its file. In FIG. 4, auxiliary transaction record 406, an invoice, is an example of an auxiliary transaction record which stores an unique invoice ID.

The external data of the auxiliary transaction records may be specific to the particular type of auxiliary transaction and may be different for each record and each file. To emphasis the freedom in defining these external fields, they are labeled "unknown #1, unknown #2, etc." in auxiliary transaction record 406.

It is important to note that multiple core transaction entries may be related to a single auxiliary transaction entry. An example of this could be a sales order. A complex sale could involve multiple shipments, modifications, returns, and back orders. Each of these events could generate an entry in the core accounting files. Each of these entries would be related to the original sales order. In this manner, multiple core transaction records would relate to a single auxiliary sales order record.

When a new transaction is entered, the transaction control process locates the transaction sequence number record, copies the current value of the transaction sequence number to memory, increments this number, and replaces the current sequence number in permanent storage with the incremented number.

The process then analyzes the information supplied and determines what values to assign to a core transaction heading record. The process creates a new core transaction heading record in memory, assigns field information to the record, and saves this record to permanent storage. The process also determines what accounts are to be affected by the transaction according to the type of the transaction and the information supplied. For each account, the process creates a new core transaction component record in memory, assigns field information to it, and save this record to permanent storage.

The transaction control process passes the information about all the accounts affected to update accounts program 322. The process also passes along all supplied information and information about the records the process has created to auxiliary transaction control program 324.

Auxiliary transaction control program 324 is activated by transaction control program 304 to carry out additional processing dependent on the type of transaction entered.

Auxiliary transaction control program 324 analyzes the information supplied by the transaction control program 304 and determines which auxiliary transaction files 312 will be needed for additional permanent storage. The process creates new auxiliary transaction records in memory, assigns the core transaction ID and other field information to the records, and saves these records to permanent storage.

Auxiliary transaction control program 324 also locates the core transaction heading record for this transaction and stores in this heading record, the name or other identifying marker of the auxiliary files in which it has created auxiliary transaction records. This information becomes part of the permanent information stored with the core transaction heading record and enables the system to locate the auxiliary information from the information stored in the heading record.

Update accounts program 322 is activated by transaction control program 304 to carry out operations that update information affected by the transaction and stored with the accounts. Such information includes the net account balance and may include other information such as the date of last transaction affecting that account.

Update accounts program 322 analyzes the information supplied by the transaction control program 304 and determines which core account records 326 need to be modified, loads these records into memory, makes the required changes such as updating the account balance, and saves the modified information back to permanent storage. The update accounts program then passes all information to the update auxiliary account program.

Update auxiliary account program 328 updates information in auxiliary account files 314. Auxiliary account files in the depicted example include customer 330, vendor 332, and lessor 334. Various auxiliary account records may be located within each of the auxiliary account files 314.

Update auxiliary account program 328 analyzes the transaction and accounts information and determines whether any auxiliary account records exist that contain information that needs to be updated.

Each auxiliary account may be related to one or more core account. Auxiliary accounts are used to store information that is unique to a particular type of account. Whether or not an existing auxiliary account contains information that needs to be updated as a result of the transaction depends on the type and details of the transaction, and the type and details of the auxiliary account.

If auxiliary account records need to be updated, the update auxiliary account program loads these records into memory, makes the required changes, and saves the modified information back to permanent storage.

Figure 5:
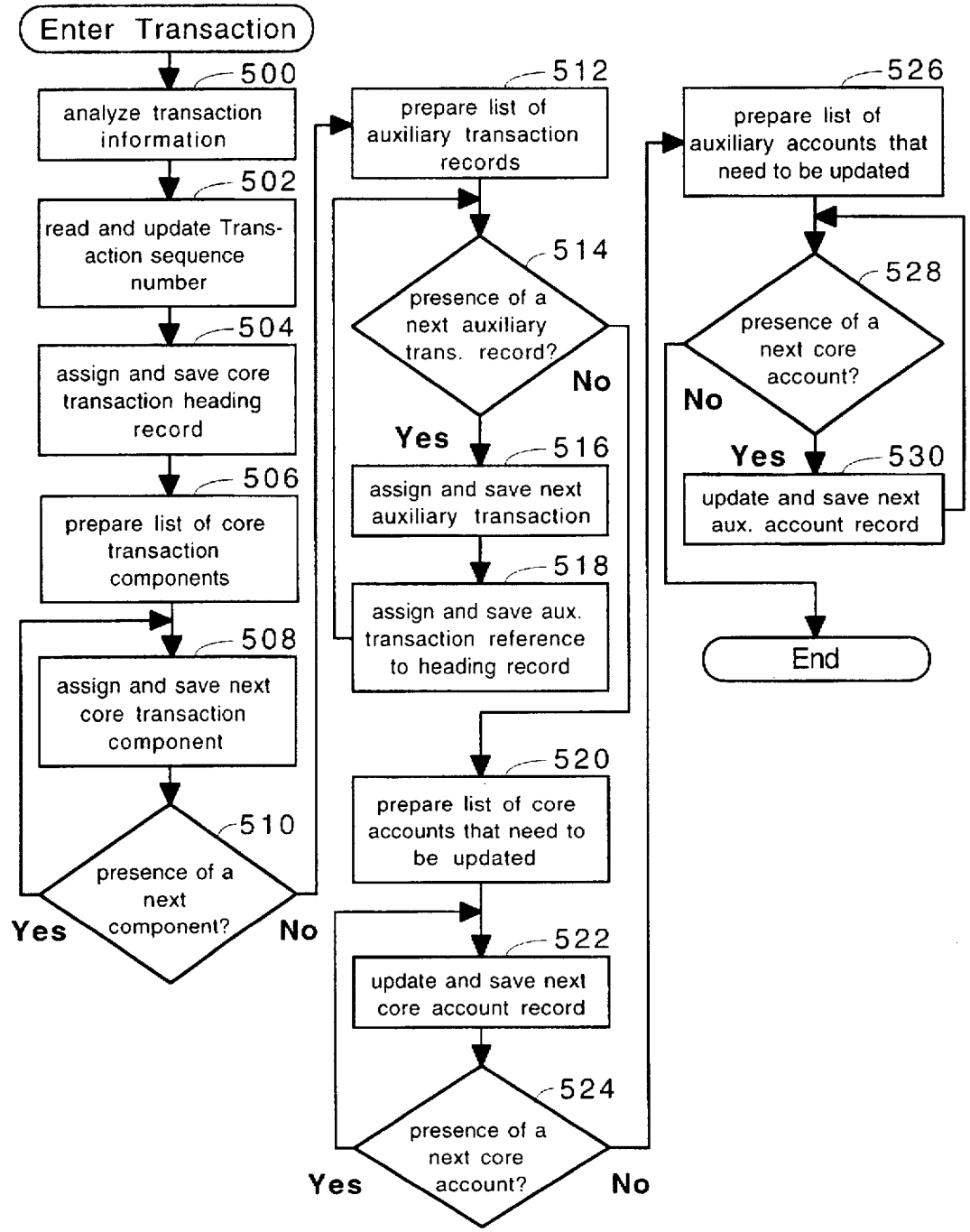
FIG. 5 is a flowchart showing the transaction control process for the entry of a new transaction in accordance with a preferred embodiment of the present invention.

With reference next to FIG. 5, a flowchart of a transaction control process employed by components from FIG. 3 is depicted for processing the entry of a new transaction in accordance with a preferred embodiment of the present invention. The process begins with the entry of a new transaction. The transaction is analyzed (step 500). Thereafter, the process reads and updates the transaction sequence number (step 502). Thereafter, values are assigned to a core transaction heading record and the core transaction heading record is saved (step 504). Next, the process prepares a list of core transaction components (step 506). The process then assigns values to the next core transaction component and saves it (step 508). The process then determines whether a next component is present (step 510). The presence of another component results in the process returning to step 508. Otherwise, the process prepares a list of auxiliary transaction records (step 512).

The process then determines whether a next auxiliary transaction record is present. (step 514). If another auxiliary transaction record is present, the process then assigns and saves the next auxiliary transaction (step 516). The process then proceeds to assign and save auxiliary transaction reference to the heading record (step 518). Thereafter, the process returns to step 514. If another auxiliary transaction record is absent, the process then proceeds to prepare a list of core accounts that need to be updated (step 520). Thereafter, the process updates and saves the next core account record (step 522). Next, the process determines whether a next core account is present (step 524). If another core account is present, the process returns to step 522. Otherwise, the process prepares a list of auxiliary accounts that need to be updated (step 526).

Afterwards, the process determines whether a next core account is present (step 528). If another core account is present, the process updates and saves the next auxiliary account record (step 530). With process returning to step 528. With reference again to step 528, if a next core account is absent, the process terminates.

Turning now to accounts, many types of financial accounts exist that differ in data and function. For example, a bank account stores an account number, the name of the bank, and the number of the last check printed. A customer's receivable account stores the customer's name, and payment and finance details. An inventory account contains a name, an item code, the quantity in stock, as well as total asset, sales, spoilage, and discount amounts. Traditional systems store each type of account in a different file. Such accounts cannot be easily reviewed. Typically a user must generate a report that extracts similar information from different types of accounts, resulting in a time consuming process requiring complex programming for each different type of report.

In accordance with a preferred embodiment of the present invention, a core account is employed in which the movement of all assets through the accounting system can be recorded as debits and credits to a core-type of account. Core accounts have only one type of structure in accordance with a preferred embodiment of the present invention.

The present invention provides two levels including general ledger accounts and accounts. Every "account" contains both a general ledger portion and an account portion in accordance with a preferred embodiment of the present invention. Many accounts may have the same general ledger portion, whereas every account is unique. A "core account" includes the general ledger account and the account.

At a minimum, each general ledger account includes a unique distinguishing marker and a particular account and type. Three basic types of accounts exist: asset, liability, and equity. Additional types may be added, such as income, expense, long term debt, and others. All of these other types are subdivisions of the basic three types of accounts.

Each account contains an unique distinguishing marker and a reference to its related general ledger account. Typically, each general ledger account also will have a name, tracking number, current balance, and other generally useful items.

This type of account structure, combined with the core transaction structure, supports a fully functioning general ledger and journal ling system. In addition, other specific information may be added by relating accounts to records containing this information. The extension of core accounts occurs in the same manner as the extension of core transactions. Core accounts can support extensions by linking a core account to an employee, a customer, a vendor, a department, an inventory item, a contract, or any other entity. For example, an account may be linked to an employee to track wages payable or it can track health benefit expenses. An account linked to customer could have access to purchase and payments histories, finance charges, and credit ratings. The processes and data structures utilized in handling financial accounts in accordance with a preferred embodiment of the present invention are further described below.

Figure 6:
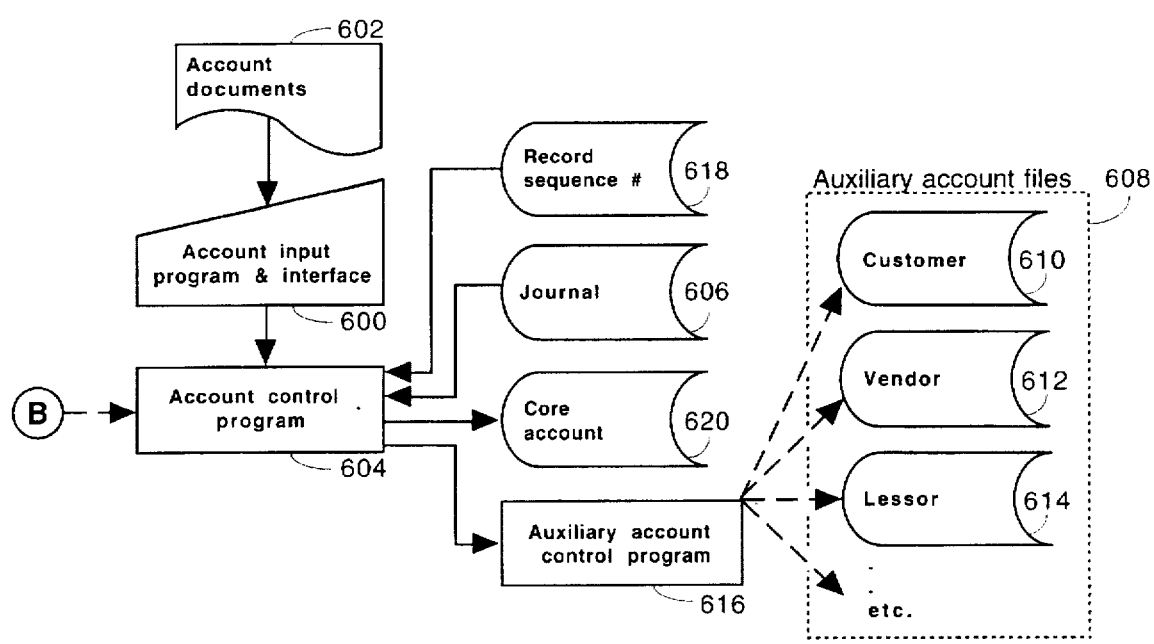
FIG. 6 is a data flow diagram of an account processing apparatus in accordance with a preferred embodiment of the present invention.

FIG. 6 shows the components in data processing system for account processing for a wide variety of account types. In FIG. 6, interface means, account input program and interface 600, enables the user to enter one of a number of predetermined types of accounts. The user chooses that type of account dictated by the information collected on account documents 602. The information entered is stored in memory until the entry is complete, according to predetermined rules, and the user directs the data processing system to accept the account into permanent storage.

The account control program 604 is activated to carry out the account control process once the data processing system verifies that the entered information is complete and consistent for the given type of account.

An account accepted for processing specifies a unique journal in journal file 606 with which the account is associated, an account code, and an account name. Auxiliary account information also may be required depending on what type of account is entered. Auxiliary account information is stored in auxiliary account files 608, which include files such as customer files 610, vendor files 612, and lessor files 614. For example, if the account is for a customer, the control process will require supporting customer information or a reference to a preexisting record in an auxiliary customer file 610, using auxiliary account control program 616.

The account control process locates the account sequence record from the record sequence file 618, reads the account sequence number, and replaces it in permanent storage with an incremented value. The account sequence number is hereafter referred to as the "account ID". The process organizes the entry into the form of a record to be stored in core account file 620. It creates a new core account record in memory, assigns field information to it, and saves this record to permanent storage. It then passes account information to auxiliary account control program 616.

Auxiliary account control program 616 is activated by account control program 604 to carry out additional processing dependent on the type of the account entered.

Auxiliary account control program 616 analyzes the information supplied by the account control program and determines which auxiliary account file will be needed for additional permanent storage. If account control program 604 indicates that an auxiliary account record already exists in permanent storage, then the auxiliary process will locate this record and modify it so that it stores the value of the core account ID. It then locates the core account record and stores in one of its fields the name or other identifying marker of the auxiliary account file.

If account control program 604 specifies auxiliary account information that does not exist in permanent storage, then the auxiliary process organizes the entered information, including the core account ID, into a form suitable for storage in the form of a record in one of the auxiliary account files 608. It creates a new auxiliary account record in memory, assigns field information to it, and saves this record to permanent storage.

Auxiliary account control program 604 also locates the core account record and stores in its fields the names or other identifying markers of the aforementioned related auxiliary account files containing related records.

Figure 7:
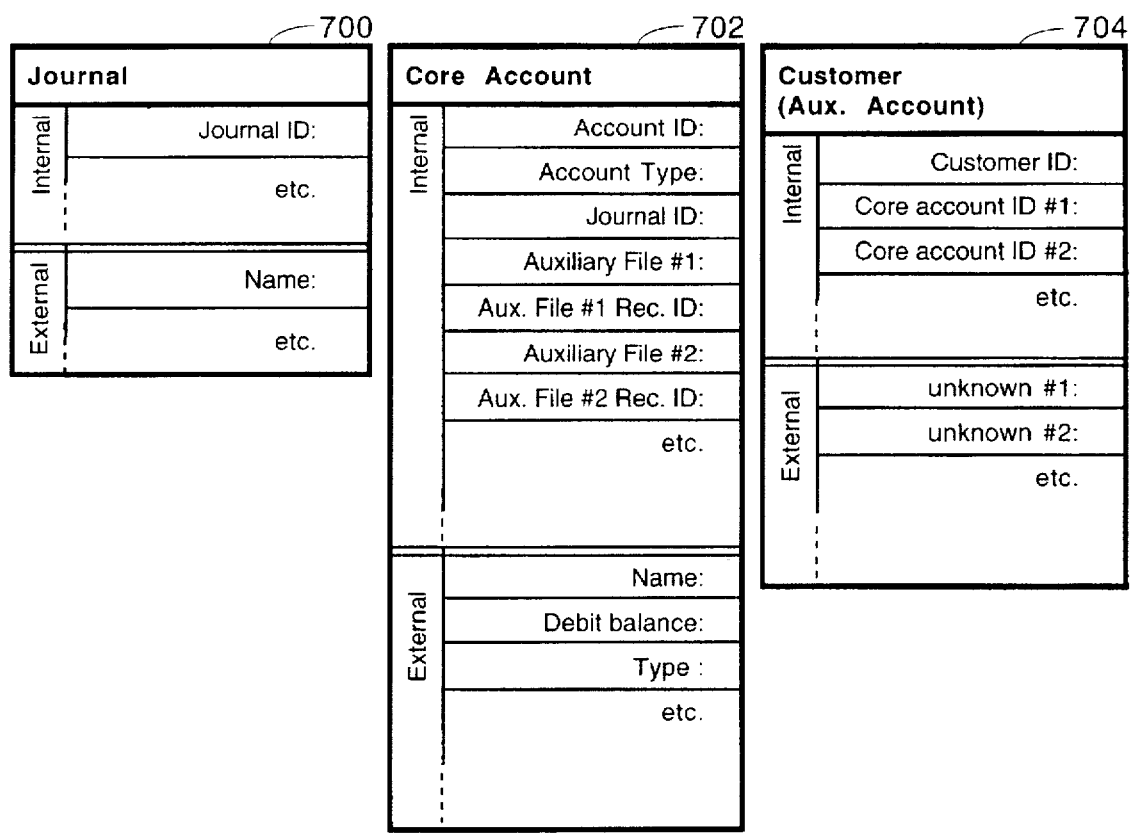
FIG. 7 is a data structure diagram of the journal and account files in accordance with a preferred embodiment of the present invention.

The journal, core account, and auxiliary account files are each comprised of a series of relocatable records whose data structures is shown in FIG. 7. With reference to FIG. 7, a journal record 700, a core account record 702, and an auxiliary account record 704 are depicted in accordance with a preferred embodiment of the present invention. Like the data structures shown in FIG. 4, these records are divided into internal data fields reserved for system use and external data fields for storing account documents information.

Each record in the journal file 606 stores as its internal data an unique identifier shown in journal record 700 as the journal ID. In its external data fields, the journal record stores its name, information relating to its relationship to other data, to its function, and the like.

Each record in the core account file 620 stores as its internal data a core account ID and the type of the account as specified through the interface means. The core account record also includes a means to identify its associated journal.

The relation between the core account entry and the auxiliary account entry must be supported through one or more possible means. One such means is illustrated in core account record 702 in which places are reserved to store numbers that identify one or more auxiliary files and the ID numbers of records in these auxiliary files. The appearance of multiple items labeled "Auxiliary File #1", "Auxiliary File #2", etc. emphasizes that more than one auxiliary file and auxiliary record can be related to a single core account record.

The internal data of the auxiliary account records located within auxiliary account files 608 consists of the related core account ID. Depending on which of various means is used to establish the relation between the auxiliary and core account records, a given auxiliary account record may or may not need to store the aforementioned core account ID's. In auxiliary account record 704, the labels "Core account ID #1", "Core account ID #2", etc. emphasize that one or more core accounts may be related to an auxiliary account record, and that the ID numbers of these core accounts may be stored with the auxiliary account record.

The external data of the core account record includes information that is required of all accounts. Such information includes the account balance, name, financial type, the date of creation, date of last modification, and the like. The set of possible financial types would contain the familiar categories of asset, liability, equity, income, expense, and the like.

If the auxiliary accounts are related to more than one core account, then they will have multiple fields for storing core account IDs, as is shown in auxiliary account record 704.

In the case where the auxiliary account records can be created without reference to any core account, such auxiliary account records will store an unique identifier to distinguish them from other records in the same auxiliary account file. Auxiliary account record 704 depicts a customer file as sample auxiliary account file structure. In this case, the customer account includes an unique identifier labeled customer ID.

The external data of the auxiliary account records may be specific to the particular type of auxiliary account and may be different for each. To emphasis the freedom to define these external field in any manner they are labeled "unknown #1, unknown #2, etc." in auxiliary account record 704.

Figure 8:
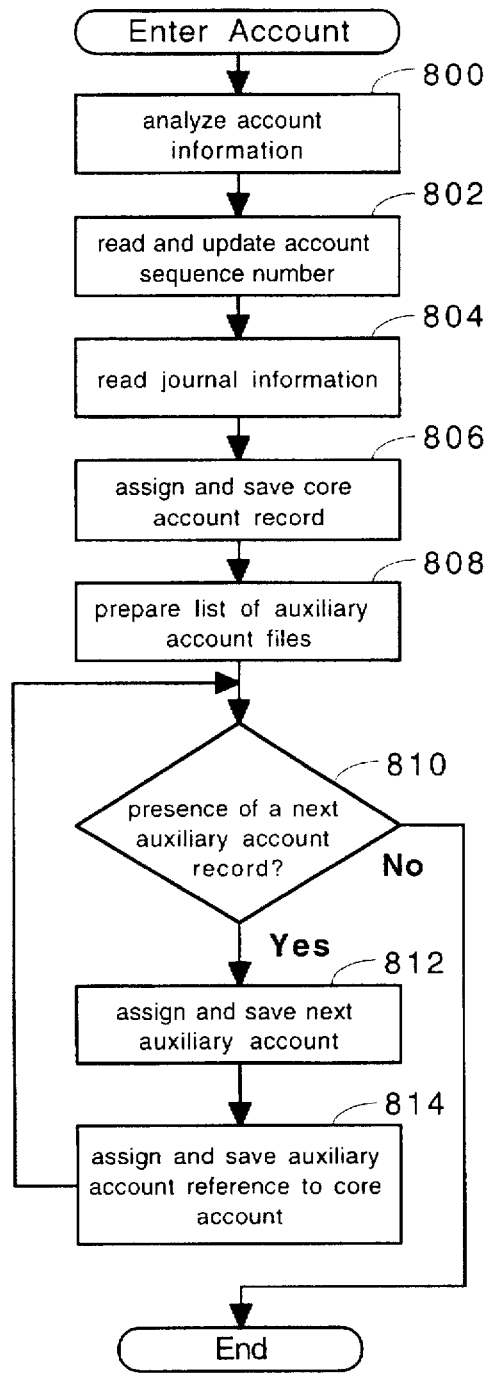
FIG. 8 is a flowchart showing the account control process for the entry of a new account in accordance with a preferred embodiment of the present invention.

With reference now to FIG. 8, a flowchart of an account control process for processing entry of a new account is depicted in accordance with a preferred embodiment of the present invention. The process begins by analyzing account information (step 800). Then, the process reads and updates the account sequence number (step 802). Journal information is read by the process (step 804). The process assigns and saves a core account record (step 806). Next, the process prepares a list of auxiliary account files (step 808). The process then determines whether a next auxiliary account record is present (step 810). If another auxiliary account record is present, the process then assigns and saves the next auxiliary account (step 812). Thereafter, the process assigns and saves auxiliary account reference to the core account (step 814). The process then returns to step 810. In step 810, if a next auxiliary account record is absent, the process then terminates.

The relationship between core transaction heading, core transaction components, core accounts, and journals, as described in detail above, allows any transaction to be associated with one or more journals.

Through these relationships every transaction involves at least one core account and every core account is related to exactly one journal. Consequently, all transactions affect at least one journal.

As a consequence, the relationships between core transaction heading records and journal records is precisely determined by the data and the file structure. These relationships are not determined by the user through the interface means. This consequence can be rephrased as saying that when the user enters a transaction, the system automatically manages all relationships to journals.

Previously, journals were books employed to record transactions. This type of structure has been carried over into accounting programs. In such presently available programs, a transaction entered for an account in one journal will show up only in that journal and not in another journal that is related to the same account. The entry into the first journal will be reflected in the second journal only upon batch processing of the transactions and entries at a predetermined time. The present invention provides a method and apparatus for allowing entries made in one journal for a particular account to be reflected in all journals that included or are associated with that account.

In its simplest form according to the present invention, a journal is a grouping of accounts. Once these groups have been established, it is possible to selectively add functions to different journals in accordance with a preferred embodiment of the present invention. For example, a cash journal group may contain as a member any asset-type account. Once an account is assigned to the cash journal, the account may store specific additional information including: the last number in a sequence of numbered checks, each withdrawal that will be associated with a payee, and a payment date, the program that will reconcile statements for that account, and transactions involving cash journal accounts having special options. In a similar manner, special functions may be developed for other journals, such as expense, income, payable receivable, and others. These functions will apply to accounts linked to the appropriate journal.

In accordance with a preferred embodiment of the present invention, accounts linked to the same general ledger account are linked to the same journal. In other words, journal assignments are performed at the general ledger account level. Each general ledger account belongs to one journal and each of its accounts belongs to the same journal.

More details regarding the processes and data structures for the journal system in accordance with the preferred embodiment of the present invention are described in more detail below.

Figure 9:
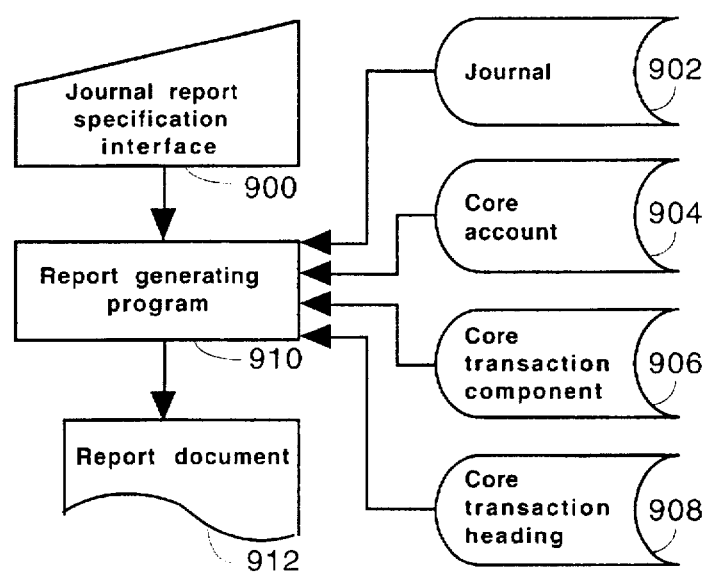
FIG. 9 is a data flow diagram of an journal report processing apparatus in accordance with a preferred embodiment of the present invention.

FIG. 9 shows components in a data processing system for journal report processing for a wide variety of journal report types in accordance with a preferred embodiment of the present invention. In FIG. 9, an input means, a journal report specification interface 900, enables the user to specify a journal and a combination of report criteria.

A journal report is a summary of past transactions that have affected core accounts related to one journal record. A journal is represented by a journal record stored in the journal file 902.

In addition to relating to a specific a journal, a journal report is based on various report criteria. These criteria consist of ranges of possible data values and functions of data values stored in records of core account file 904, core transaction component file 906, and core transaction heading file 908.

One example of a report specification is a list of all transactions for a particular core account that contains recording dates within a specified range. Another example is a list of all account balances of accounts related to a particular journal, identified and sorted by name.

Journal report specification interface 900 records the user's choice of report criteria and passes this information to report generating program 910. This program is designed so that it can create a report from any possible information passed to it by the report interface.

Report generating program 910 analyzes the information and converts it to a series of requests for report data, and processes applied to this report data, to generate intermediate report information. Report generating program retrieves data from various sources such as journal file 902, core account file 904, core transaction component file 906, and core transaction heading file 908.

Report generating program 910 may need further processing instructions as a consequence of choices that could not be predicted until after the intermediate report information is obtained. For example, it may occur that some report information can not be distinguished according to the report specifications. In this case, the user must choose amount additional report criteria. In the previous example, in which the specification was a list of transactions with recording dates within a specified range, this situation would arise when transactions were entered into the data processing system without a recording date.

Once the user supplies additional specifications, if necessary, report generating program 910 continues processing the report data. The user can be queried repeatedly to obtain a complete set of report specifications in order to put the report information in its final form.

The generating program passes the final report information to a display or storage apparatus to produce a report document 912.

Various means exists through which the association between core accounts and journals can be managed. In a preferred embodiment of the present invention, this association is maintained as an journal code stored in a core account field. FIG. 7 shows the journal ID stored in a field of the core account file 702.

Alternatively, this association may be managed by storing a journal code in record of an additional and separate file. In another preferred embodiment of the present invention, each core account is related to a general ledger account. Each general ledger account, stored as a record in a general ledger account file 1000 in FIG. 10, refers to an unique journal.

Figure 10:
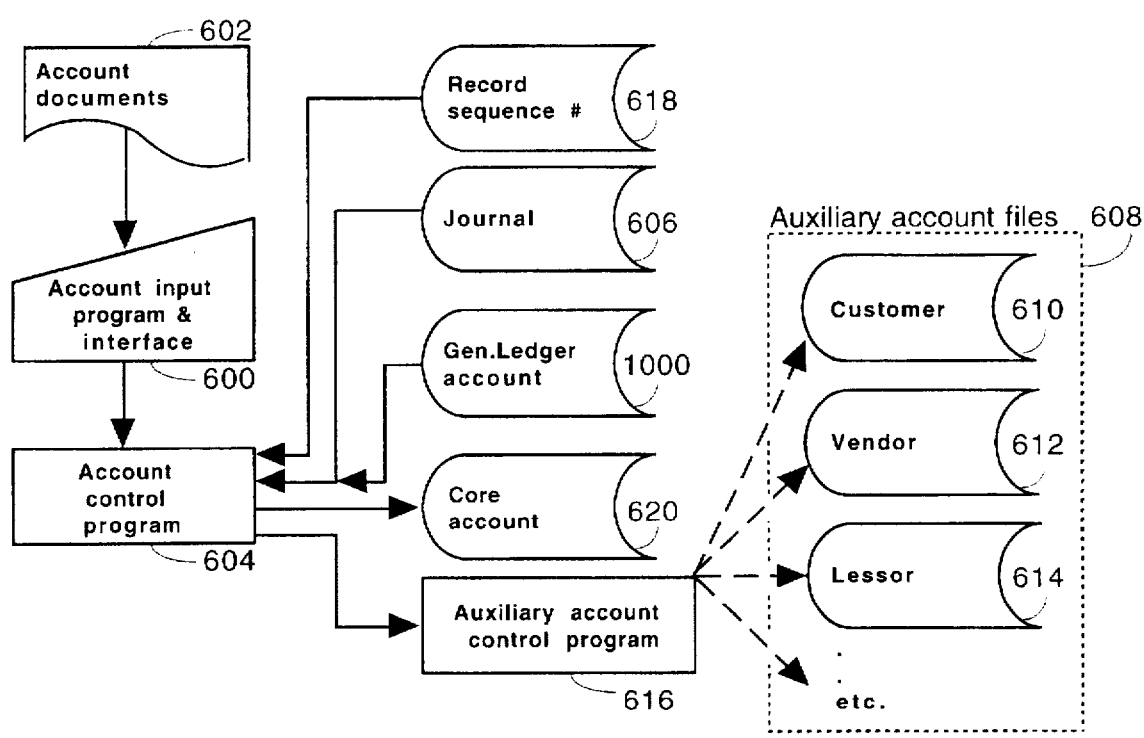
FIG. 10 is a data flow diagram contributing to a secondary embodiment distinguished from the primary embodiment by the including of a general ledger account file in accordance with a preferred embodiment of the present invention.
Figure 11:
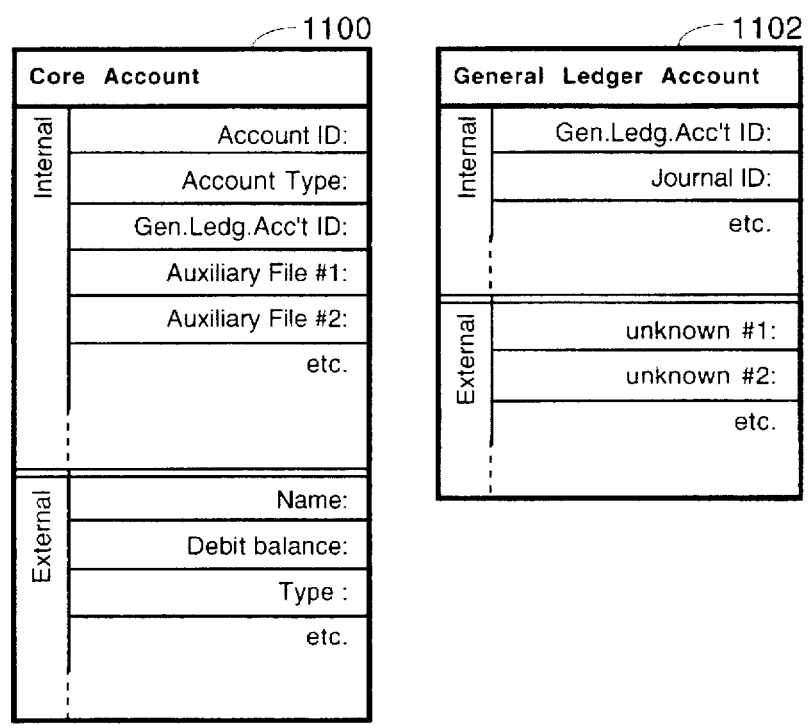
FIG. 11 is a data structure diagram for the core account and general ledger account files used in the secondary embodiment of the present invention in accordance with a preferred embodiment of the present invention.

Referring next to FIG. 10, components in a data processing system are illustrated in which such a core account file works in conjunction with such a general ledger account file. FIG. 10 only differs from the depicted embodiment in FIG. 6 in the addition of general ledger account file 1000. The file structure of this depicted embodiment is shown in FIG. 11, which shows the data structure for records in core account and general ledger account files used in the secondary embodiment depicted in FIG. 10. With reference to FIG. 11, core account record 1100 and general ledger account record 1102 illustrate data structures utilized in accordance with a preferred embodiment of the present invention.

The only difference between the structure of the core account file 702 in FIG. 7 and core account file 1000 is that each core account record now refers to an unique general ledger account rather than to an unique journal. A general ledger account ID field now replaces the journal ID field shown in core account record 702.

The structure of the general ledger account file is only determined to the extent that it supports the relation of a core account to a unique journal. To this end, the internal data of general ledger account record 1102 includes at least a general ledger account ID and a journal ID. The external data of the general ledger account record 1102 are arbitrary.

Figure 12:
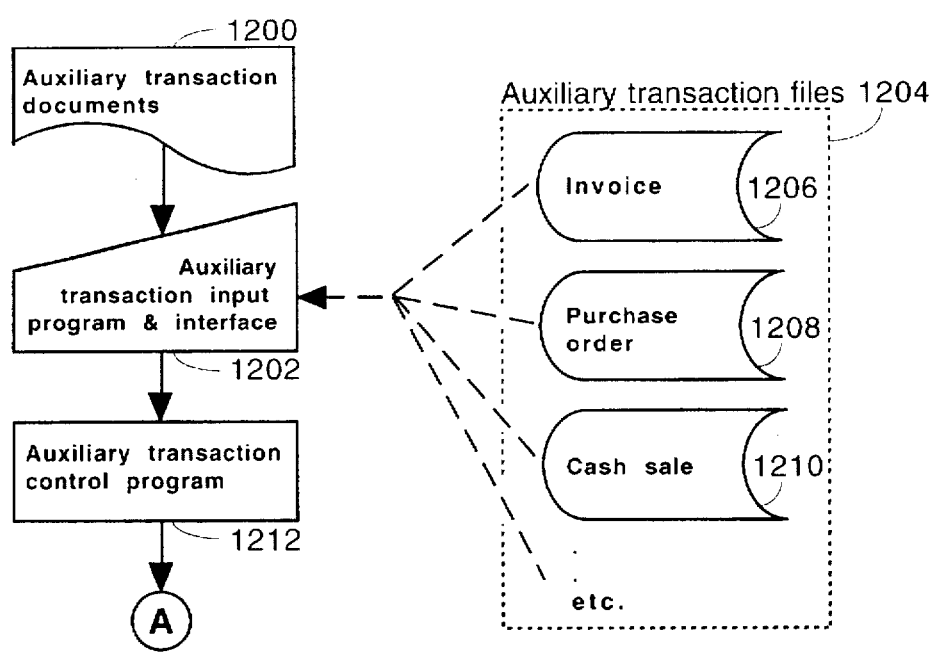
FIG. 12 is a data structure diagram for entering auxiliary and core transaction information used in accordance with a preferred embodiment of the present invention.

Various means exists through which the core and auxiliary transaction may be entered, and similarly for the entry of core and auxiliary accounts. FIG. 12 shows a means whereby the user enters auxiliary transaction information through one of several possible auxiliary input programs. Auxiliary transaction documents 1200 are entered by a user through auxiliary transaction input program and interface 1202. This program and interface represents one of various auxiliary transaction input programs and interfaces that the user might choose. The auxiliary transaction input program and interface 1202 retrieves related data from auxiliary transaction files 1204, which includes files such as invoice 1206, purchase order 1208, and cash sale 1210.

Auxiliary transaction control program 1212 then automates the entry of the core and auxiliary transaction records by passing the appropriate record data and operating instructions to the transaction control program 304 in FIG. 3 which processes core and auxiliary transaction information in the manner described above.

The connection between the auxiliary transaction control program and the transaction control program is represented by the item labeled "A" on both FIG. 3 and FIG. 12. The dotted line connecting "A" with the transaction control program 304 in FIG. 3 indicates that flow of information to FIG. 3 from FIG. 12 is an alternative that may be supported simultaneously with the means shown in FIG. 3.

Figure 13:
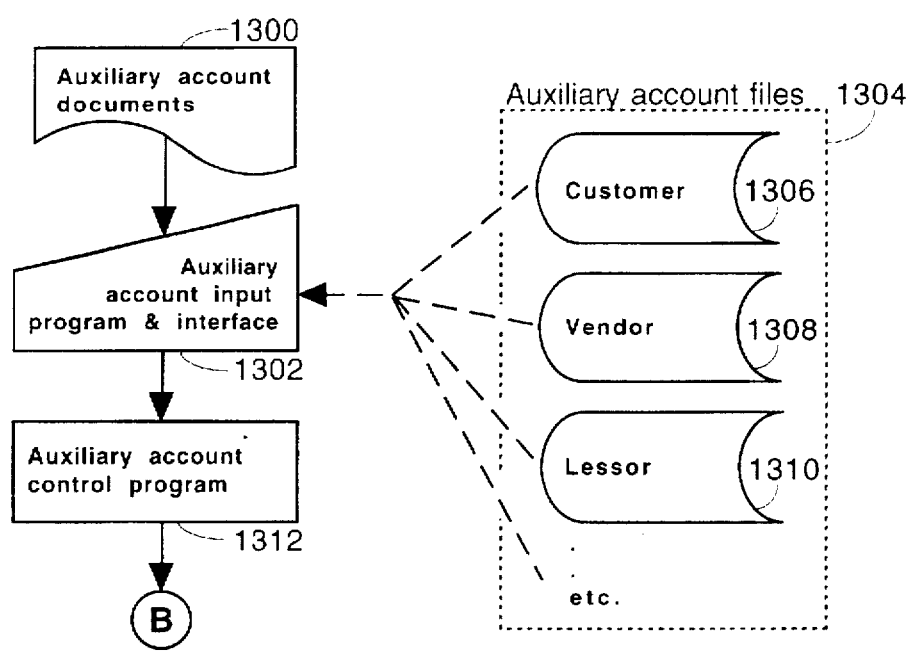
FIG. 13 is a data structure diagram for entering auxiliary and core account information in accordance with a preferred embodiment of the present invention.

In a similar manner, the user could enter auxiliary account information through one of several possible auxiliary input programs, as shown in FIG. 13. Auxiliary account documents 1300 are entered by a user through auxiliary account input program and interface 1302. This component represents one of various auxiliary account input programs and interfaces that the user could have chosen. Auxiliary account input program 1302 retrieves related data from auxiliary account files 1304, which includes files such as customer 1306, vendor 1308, and lessor 1310.

Auxiliary account control program 1312 then automates the entry of the core and auxiliary account records by passing the appropriate record data and operating instructions to account control program 604 which processes core and auxiliary account information in the manner already described.

The connection between the auxiliary account control program and the account control program is represented by the item labeled "B" on both FIG. 6 and FIG. 13. The dotted line connecting "B" with the account control process 604 in FIG. 6 indicates that flow of information to FIG. 6 from FIG. 13 is an alternative that may be supported simultaneously with the means shown in FIG. 6.

The main difference between FIGS. 3 and 6 and FIGS. 12 and 13 is the manner in which the information is input. In the FIGS. 3 and 6, the entry process begins at a general level, governed by the transaction and the account input programs, and moves to a specific level, governed by the auxiliary transaction and auxiliary account control programs. This input sequence is appropriate in cases where each core transaction or account is related to a single auxiliary transaction or account.

In FIGS. 12 and 13, the entry process begins at a specific level, governed by the auxiliary transaction input program and interface 1202 and auxiliary account input program and interface 1302 and moves to a general level, governed by the transaction control program 304 and account control program 604. This input sequence is appropriate when a single auxiliary transaction or auxiliary account is related to multiple core transactions or accounts.

The concept in which core accounts and transactions are related to auxiliary information can be realized in many ways. The concept's value lies in this flexibility. In each case, there are certain similarities that distinguish the central core accounts and core transactions from the auxiliary items attached to them. The following examples of account file structures show particular realizations of this concept in accordance with a preferred embodiment of the present invention.

Figure 14:
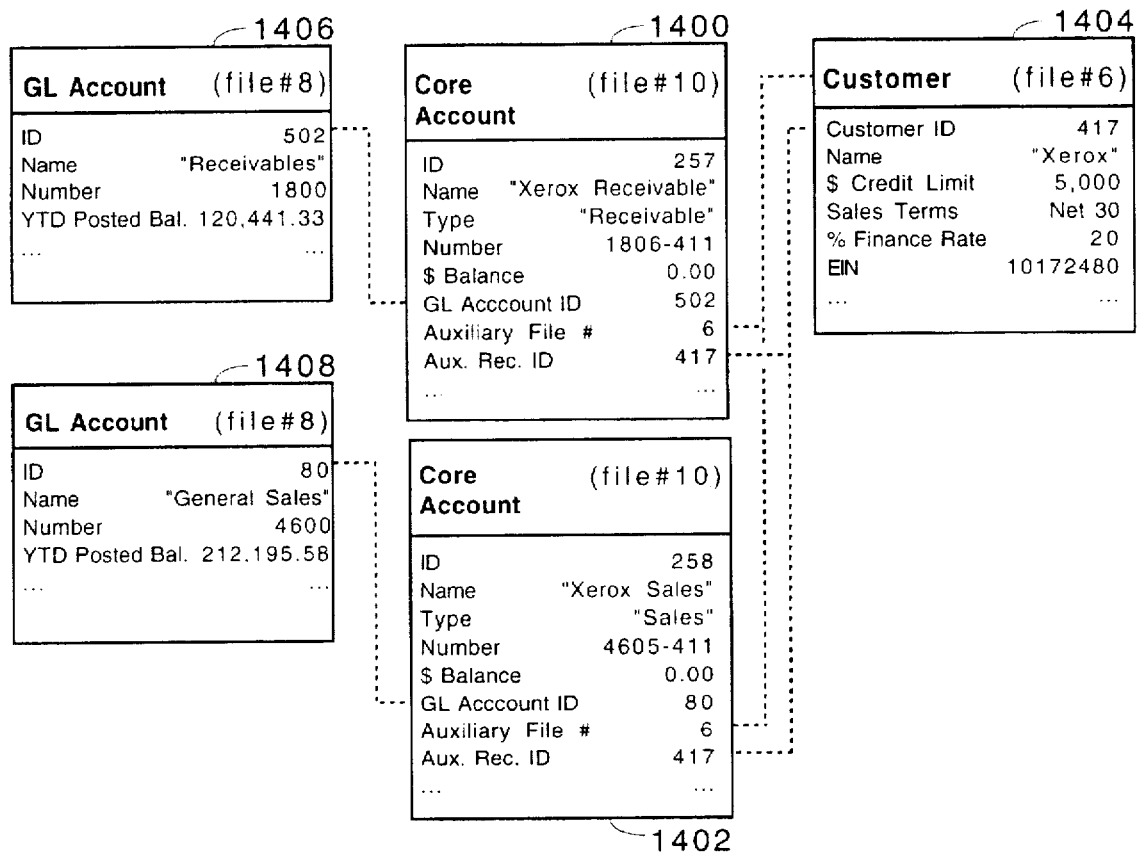
FIG. 14 is a data structure diagram of a customer account and related core and auxiliary records in accordance with a preferred embodiment of the present invention.

In FIG. 14, each box represents a particular record in the file whose name and file number appear at the top. Below the file names and to the left are columns of field names, to their right are the values assigned to those fields. The dotted lines connecting values in different records are drawn only to draw the reader's attention to the ID values that relate one record to another.

All file names and numbers, and field names and values are illustrative. While some use of ID fields to relate files is necessary, this particular use of ID fields is one of various alternatives. There are other ways in which ID fields can be used to connect core and auxiliary information.

The file names, file numbers, and field names are usually defined by the programmer when the database is set up. This constitutes what's called the "file structure," which remains relatively static and determines the type of information stored in the database. The number of records and the contents of these records are supplied by the user and constitute the system's data.

FIG. 14 shows core account records 1400 and 1402 used in conjunction with an auxiliary record in the Customer file 1404. Taken together the core accounts and the customer record fully specify the data associated with a customer. The figure includes the relationship of Core Account records to General Ledger Account records, as shown in FIG. 10. FIG. 14 shows two records 1400 and 1402 in the Core Accounts file, two records 1406 and 1408 in the GL Account file, and one record 1404 in the Customer file.

FIG. 14 shows the customer record 1404 containing fields with information that is particular to customers. These fields include a customer name, and dollar value credit limit, terms of sale, an annual finance rate in terms of percent used to assess late payment charges, and Employer Identification Number (EIN), as well as other possible fields. Each of these is assigned a sample value.

The field in records 1400 and 1402 in the Core Account file named "Aux. Rec. ID" stores the value 417, which is the ID of the customer record it's related to. The field labeled "Auxiliary File #" stores the number of the file in which this record resides, in this case record 1404 in the Customer file. In general, a core account could be related to a record in a file other than the Customer file. It might be related to a record in the Vendor file, for example. This vendor record might share the same ID number as a customer record, 417 in this case. However, the Vendor file would have a different file number from the Customer file. The resulting combination of Auxiliary File # and Auxiliary Record ID values would distinguish the relationship to a customer record whose ID was 417, from a vendor record with the same ID.

Each core account has a field labeled "GL Account ID" which stores the ID of a record such as record 1406 or 1408 in the GL Account file. Many accounts can be related to each GL account. A processes known as "posting to the general ledger," well known to those practiced in the art, consolidates the debits and credits made to various accounts and summarizes their effect upon general ledger accounts. In the present invention, this is done by summing the net changes to the many individual account and adding this sum to the balances stored with the related general ledger accounts. At such time when posting is performed, the newly computed values for the posted year-to-date balances are stored in the fields marked "YTD Posted Bal."

In the current example, each account stores the ID number of the GL account that it's related to. In this case, the two accounts are related to different GL accounts. The core accounts are related to specific GL accounts through their GL Account ID values. Either the user or the programmer can assign values to the GL Account ID field of the core account record.

In some of the so-called "Object Oriented Database Management Systems" (OODBMS), the user can change aspects of the file structure. This enables the user to store new types of information—that is, information represented by configurations of different fields. This is useful to users who deal with constantly changing types of information. In this case, the user might define a new type of auxiliary file to be related to a core account. For example, they might define a "Preferred Customer" file whose structure is similar to the Customer file but carries some unique information. Even in this case, however, a relation between auxiliary and core account files would exist. The core account file would remain structurally unchanged and would continue to play a central role.

In accordance with a preferred embodiment of the present invention, certain aspects of the process for entering core and auxiliary account information are automated. In particular, the user need not understand the underlying file structure, with its segregation of core from auxiliary accounts. Requiring this would be undesirable because from the user's point of view the related information constitutes a single concept. The concept, in this case, is that all the information being entered constitutes customer information. The segregation of information into records in separate files, and the storage and retrieval of this information, is handled by the Account Control Program.

Figure 15:
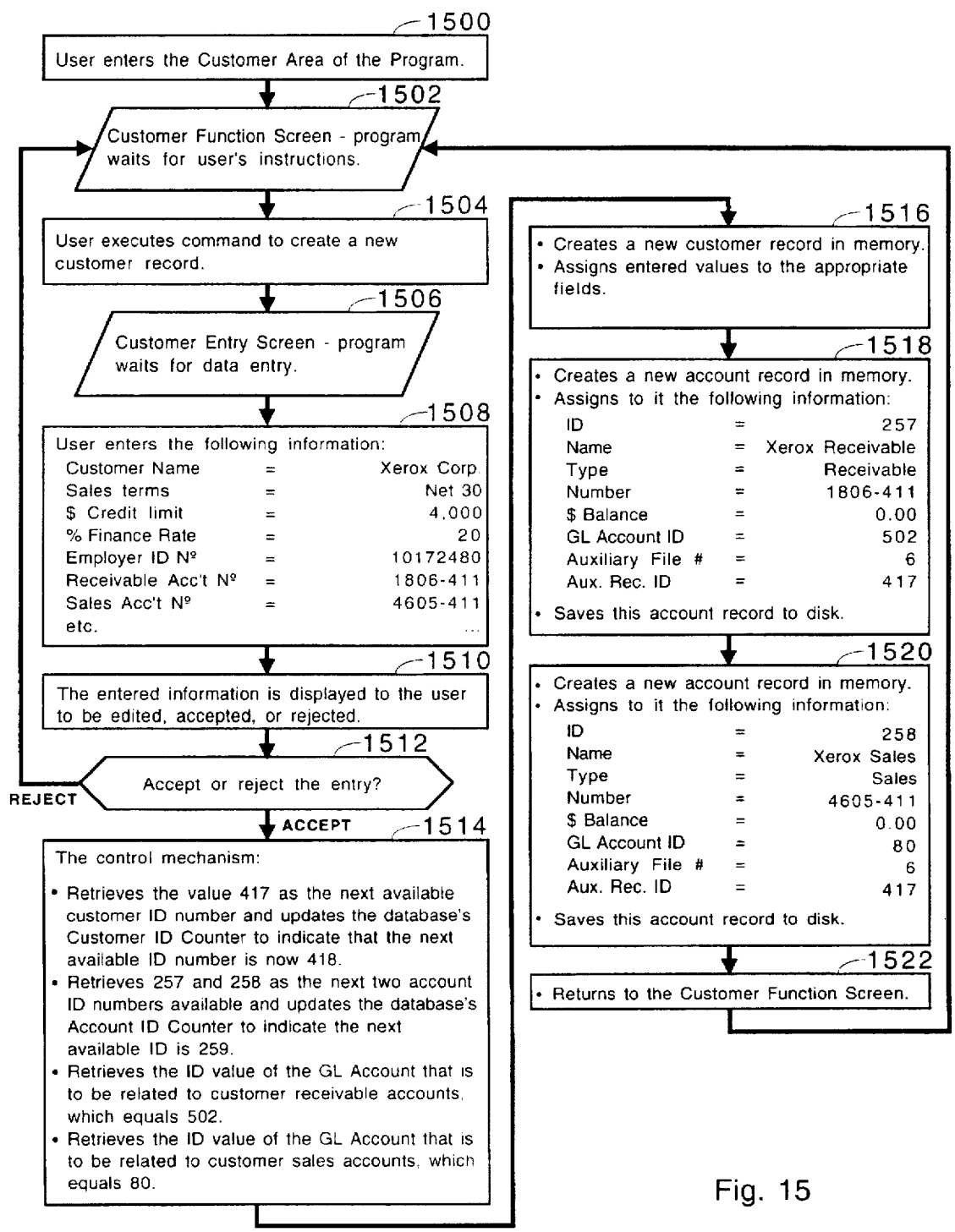
FIG. 15 is a flow chart in pseudo code form of a process showing steps involved in entering a customer's record for the data structures depicted in FIG. 14 in accordance with a preferred embodiment of the present invention.

FIG. 15 provides a flow chart containing a pseudo code outline of the steps that an Auxiliary Account Control Program (labeled 1412 in FIG. 13) together with an Account Control Program (labeled 604 in FIG. 6) would follow to organize the information entered for a new customer, and to store this information in the record structure shown in FIG. 14.

The process begins with the user entering the customer area of the process for account entry control (step 1500). A customer function screen is then presented to the user and the process awaits instructions from the user (step 1502). A command is executed to create a new customer record (step 1504). A customer entry screen is displayed and the process awaits data entry (step 1506). Information is then entered by the user (step 1508) and the entered information is displayed to the user for editing, acceptance, or rejection (step 1510). If the information is rejected, the process returns to step 1502. If the user accepts the information, a control mechanism for retrieving appropriate ID values and updating the ID values in the appropriate database occurs (step 1514). The process then creates a new customer record, assigns entered values to the appropriate fields, and saves the record (step 1516). New account records are created and assigned information (steps 1518 and 1520). The process then returns to the customer function screen (step 1522).

Although not shown in FIG. 15, the depicted embodiment may be adapted by those skilled in the art for use in multi-user systems. A multi-user system is one where several users have simultaneous access to the data. In any such system only one user can modify any particular record at a given time. The authority to modify a record is usually granted on a first-come, first-served basis. The user who has such authority is said to have "read-write" access to that particular record at that time. For the time that this user maintains read-write access, such access is unavailable to other users. Other users are limited to "read-only" access which allows them to retrieve the record's information but prevents them from modifying it.

In multi-user systems, no guarantee exists that a particular user will obtain read-write access to every record that he or she may need to change. Each user, or rather the program being run by each user, must verify read-write access to whatever records need to be modified. Should the program find that it can not obtain read-write access for certain records, the program must do either of two things. It can either delay further execution until it can obtain read-write access, or it can abandon the record modification process and undo whatever changes it had already made. The program would inform the user of the problem and return to an idle state to await the user's instructions.

These are standard issues in the realm of multi-user database programming and are well known to those skilled in the art. In the outlines in FIG. 15 the Input Control Procedure is assumed to have read-write access to each of the preexisting records that it needs to modify.

Figure 16:
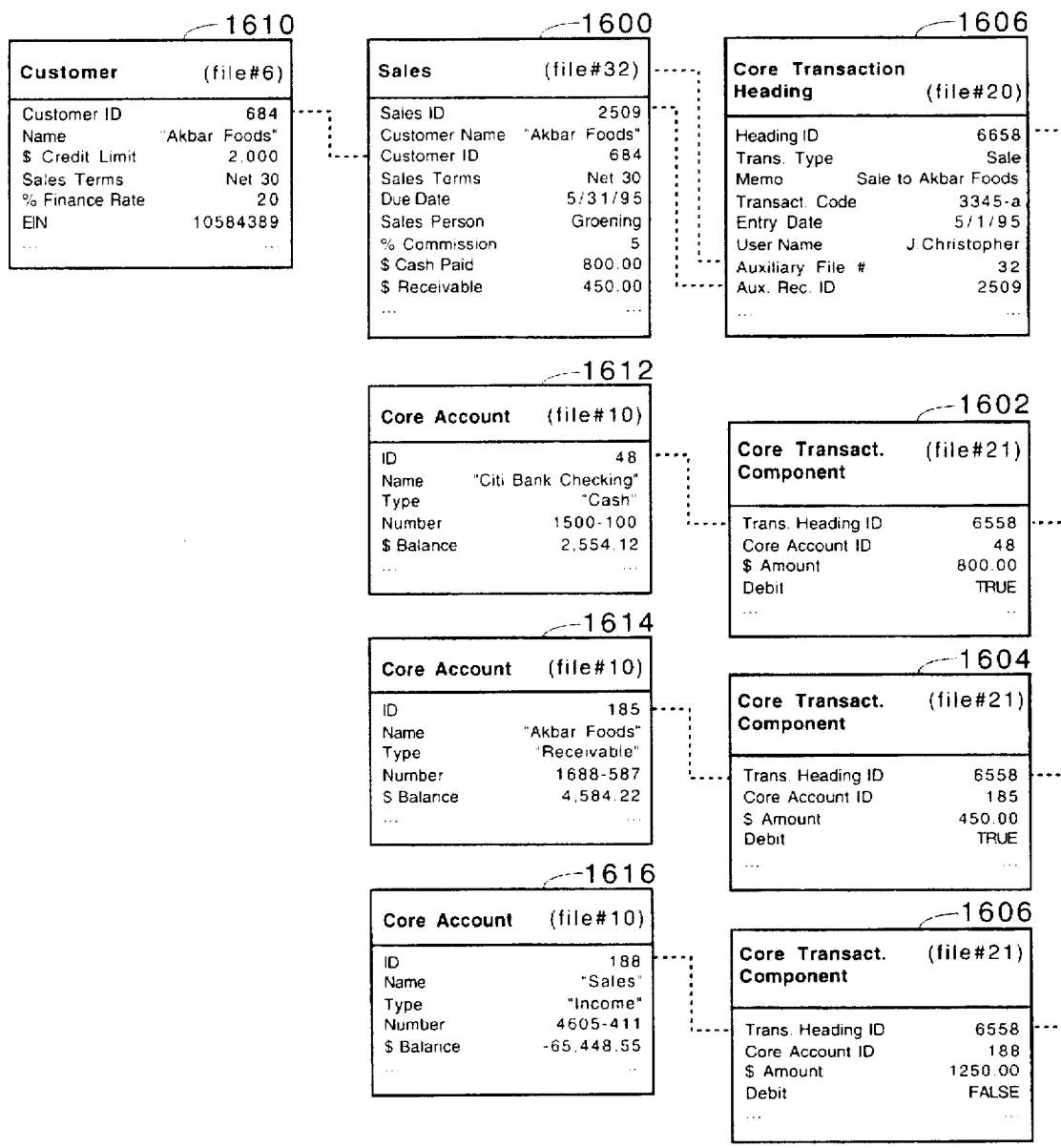
FIG. 16 is a data structure diagram showing a sales account with related core and auxiliary records in accordance with a preferred embodiment of the present invention.

FIG. 16 shows examples of a core transaction heading record 1600 and component records 1602–1606 used in conjunction with an auxiliary record, sales transaction record 1608, in the Sales file in a transaction. Core transaction records 1600–1606 together with the sales record 1608 fully specify a sales transaction. The relationships of sales transaction record 1608 to the customer record 1610, and the core transaction components to core account records 1612–1616 file structure are also displayed.

Each box in FIG. 16 represents a particular record in the file whose name and file number appear at the top. The figure shows one core transaction heading record 1600 related to one sales transaction record 1608. The core transaction heading record 1600 is related to three component records 1602, 1604, and 1606, each or which are related to one core account record.

FIG. 16 shows the same record containing fields with information that is particular to a sales transaction. These fields include a customer name, terms of sale, payment due date, name of the sales person, their percent commission, the amount of cash paid, the amount of money that remains due, as well as other possible fields. Each of these is assigned a sample value.

The field named "Customer ID" in sales transaction record 1606 in the Sales file stores the ID of the record that corresponds to the selected customer, which is 684 in record 1610 in this case. The field in core transaction heading record 1600 in the Core Heading file named "Aux. Rec. ID" stores the value 778, which is the ID of the sales record it's related to. The field labeled "Auxiliary File #" stores the number of the file in which this record resides, in this case the Sales file. In general, a core heading record could be related to a record in a file other than the Sales file. It might be related to a record in the Purchase file, for example. This purchase record might share the same ID number as a sales record but would be distinguishable because it resides in a different file. All file names and numbers, and field names and values are illustrative. While some use of ID fields to related files is necessary, this particular use of ID fields is one of various alternatives. There are other ways in which ID fields can be used to connect core and auxiliary information.

Figure 17:
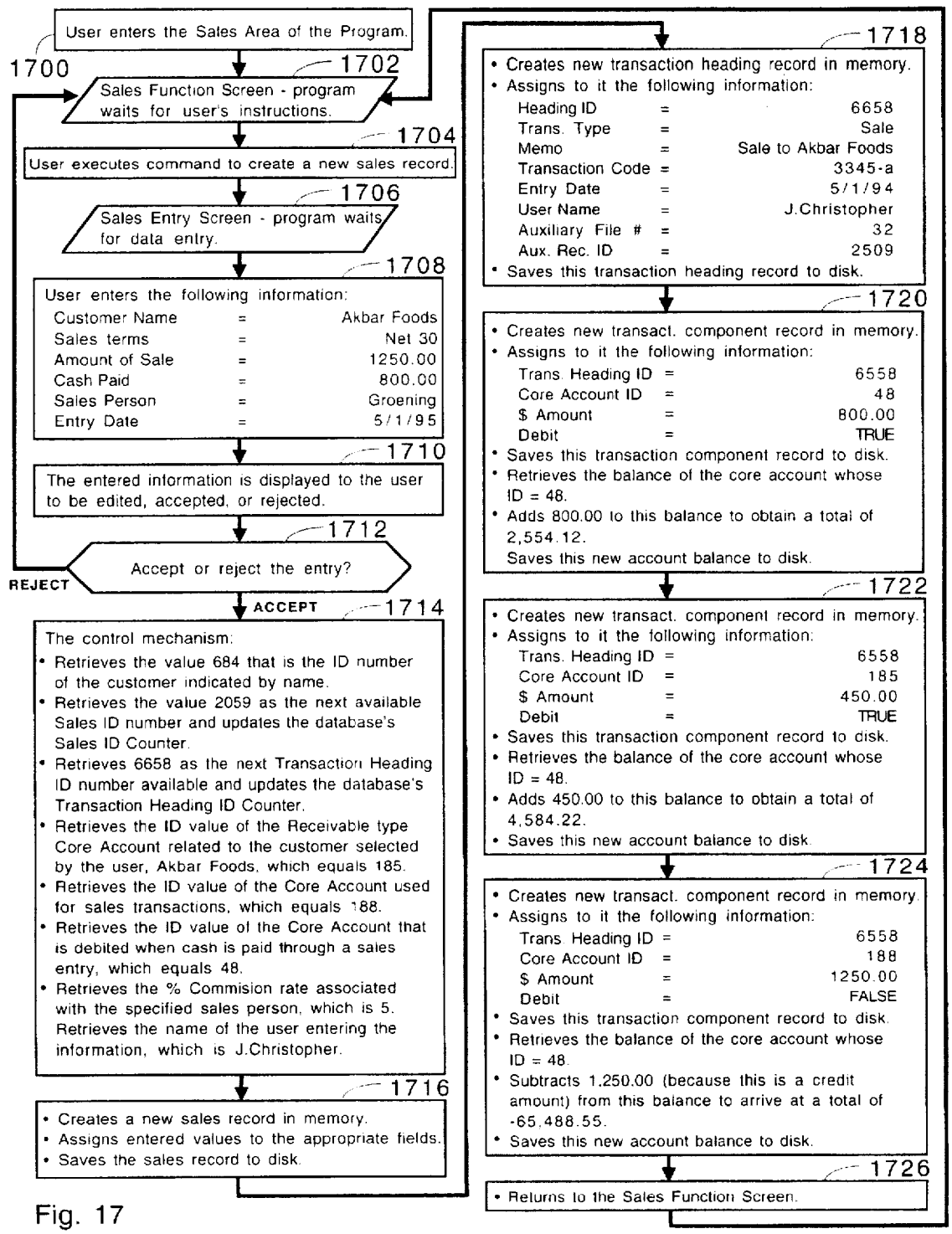
FIG. 17 is a flow chart in pseudo code form showing the steps involved in entering a sales record using the data structures in FIG. 16 in accordance with a preferred embodiment of the present invention.

FIG. 17 shows a flow chart providing a pseudo code outline of the steps that an Auxiliary Transaction Control Program (labeled 1212 in FIG. 12), together with a Transaction Control Program (labeled 304 in FIG. 3), together with an Update Accounts Program (labeled 322 in FIG. 3), would follow to organize the information entered for a new sales transaction, and to store this information in the record structure shown in FIG. 16.

The process begins with the user entering the sales area of the process (step 1700). A sales function screen is displayed to the user and the process waits for user instructions (step 1702). The user executes a command to create a new sales record (step 1704). The process displays a sales entry screen and waits for data entry (step 1706). Information is entered by the user (step 1708). The entered information is displayed for editing, acceptance, or rejection by the user (step 1710). In response to a rejection of the entry, the process returns to (step 1702). If the user accepts the information the process retrieves unique identifiers and other information for the record (step 1714). Thereafter, the process creates a new sales record in memory, assigns entered values to appropriate fields, and saves the record (step 1716). The process then creates a new transaction heading and record and assigns information to it (step 1718). The process also creates and assigns information to transaction component records (steps 1720-1724). The process then returns to the sales function screen (step 1726) and waits for user's instructions (step 1702).

The concept of relating each core account to an unique journal can be realized in many ways in accordance with a preferred embodiment of the present invention. In FIG. 7, journal record 700 in the journal file is directly related to the core account 702 in the core account file through the Journal ID field. In FIG. 11, the journal record, which is not shown but has the same structure journal record 700 as in FIG. 7, is related to the general ledger account file 1102 in a similar manner.

Figure 18:
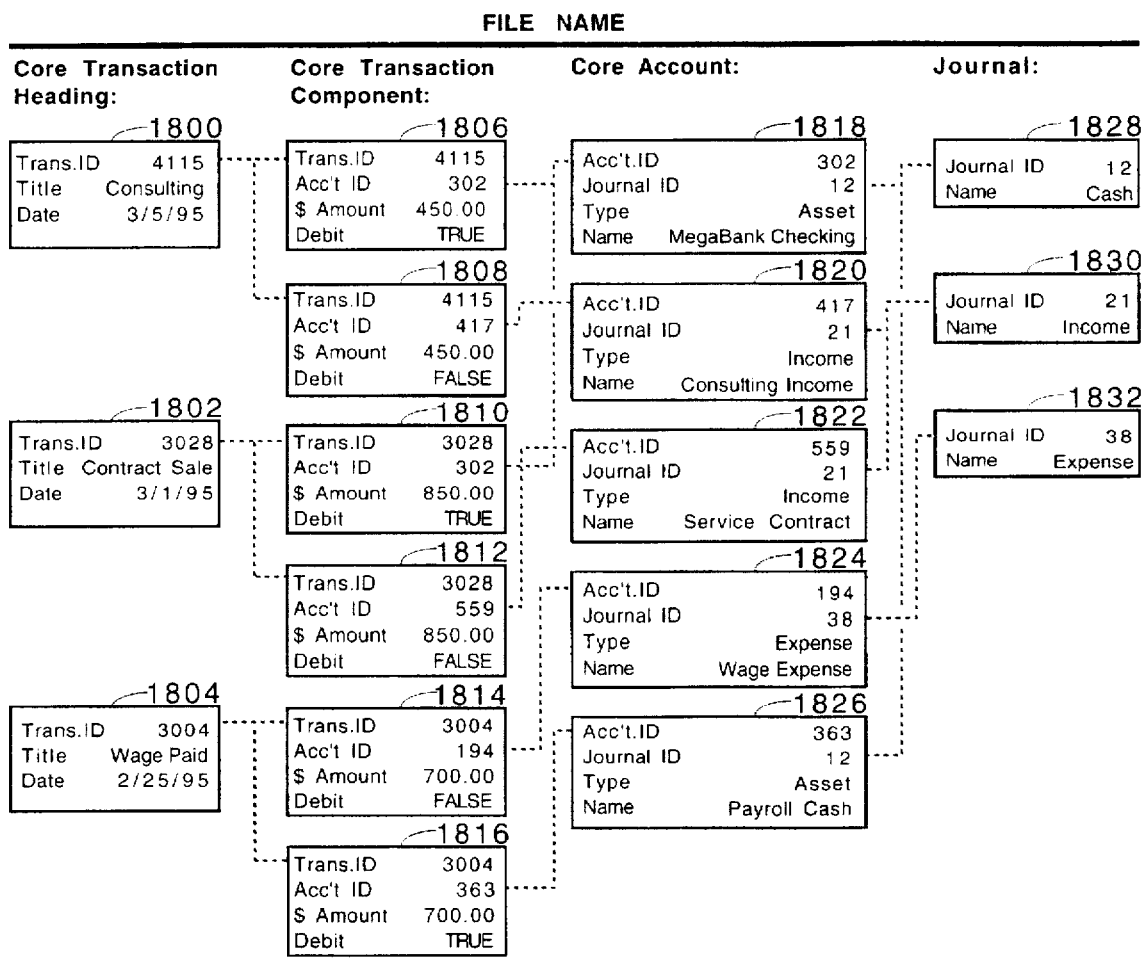
FIG. 18 is a data structure diagram showing records required for creating journal reports in accordance with a preferred embodiment of the present invention.
Figure 20:
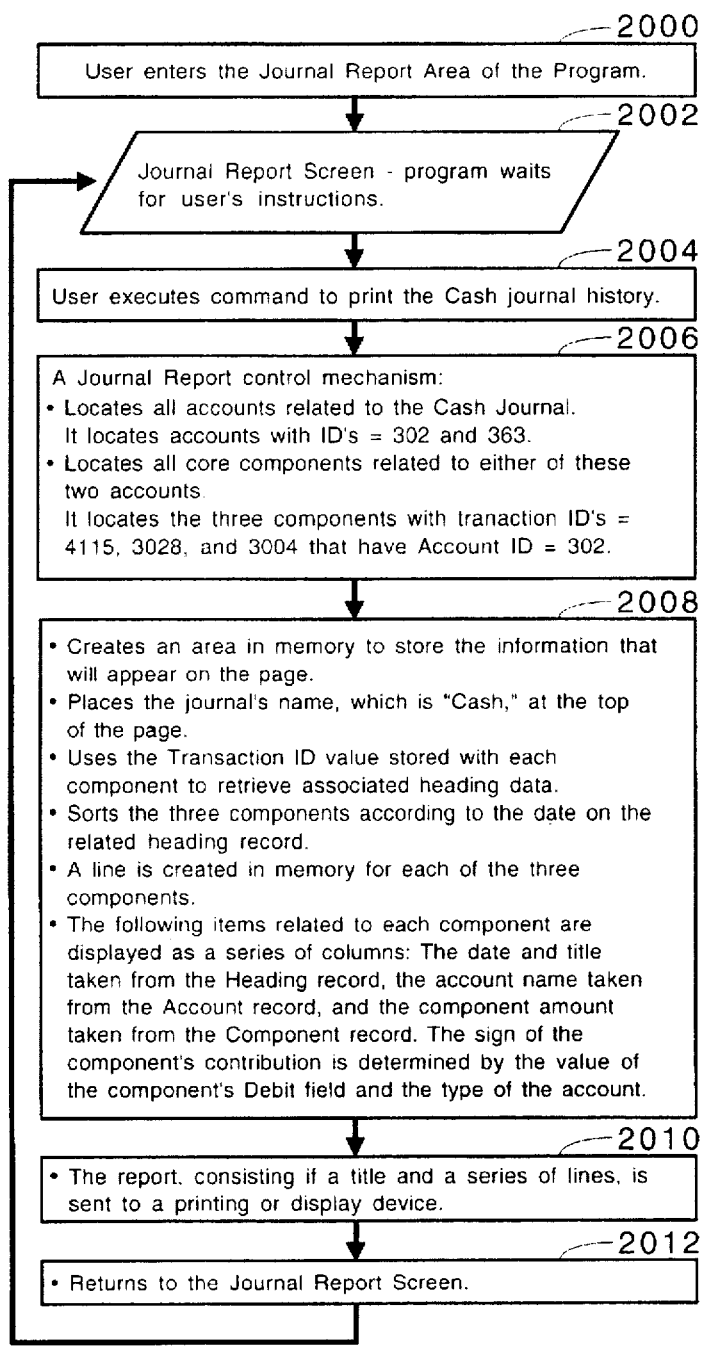
FIG. 20 is a flow chart in pseudocode form showing the steps required to retrieve and print a journal in accordance with a preferred embodiment of the present invention.

FIGS. 18-20 describe how the stored information is collected and displayed on printed reports. Although the structures shown in FIG. 7 are used in the depicted example, the data structures of that shown in FIG. 11 also may be used in accordance with a preferred embodiment of the present invention.

In FIG. 18, each of the four columns represents a file. The blocks in each column represent particular records in the file whose name appears at the top of the column. Within each block and to the left are columns of field names, to their right are the values assigned to those fields. The dotted lines connecting values in different records are drawn only to draw attention to the ID values that relate one record to another. FIG. 18 shows three Core Transaction Heading records 1800-1804, six Core Transaction Component records 1806-1816, five Core Account records 1818-1826, and three Journal records 1828-1832.

The transactions have been entered according to the processes described above. Each transaction consists of one Core Heading record and two Core Transaction Component records. The component records store the heading record's ID, the ID of the account whose balance they affect, a debit or credit amount, and a field that indicates whether the component amount is a credit or a debit.

Two of the core transaction component records 1806 and 1810 affect the MegaBank Checking account in the depicted example. These records are found using the account ID for the MegaBank Account in core account record 1818 to find records 1806 and 1810 in the Core Transaction Component column. Both records 1806 and 1810 record a debit to this account. According to the standard rules of accounting a debit to an asset account is a deposit which increases the net asset value associated with the account. Core transaction, component record 1816 affects the Payroll Cash account. Because this is a credit it represents a withdrawal.

Reading down the Component column the remaining three core transaction component records 1808, 1812, and 1814 represent a $450 credit to the Consulting Income account, a $850 credit to the Service Contract account, and a $700 credit to the Wage Expense account.

The accounts, in turn, are related to three journal records 1828-1832. The MegaBank Checking and the Payroll Cash accounts are related to the Cash journal. The Consulting Income and the Service Contract accounts are related to the Income journal. The Wage Expense account is related to the Expense journal.

When it comes time to review transaction history, the journals provide a complete audit trail. A sample of what these journal reports might look like is shown in FIG. 19. FIG. 19 shows the top of a sample printed report for each journal. Reports 1900-1904 each begin with the name of the journal. This is followed by a listing of the transaction components that affected that journal's accounts. Each component appears on exactly one journal, as described in accordance with a preferred embodiment of the present invention.

Each journal report is assembled from the above data in a similar manner. FIG. 20 is a pseudocode flow chart illustrating this process in the case of the Cash journal. The process begins with the user entering the journal report area of the process (step 2000). The process then displays a journal report screen and waits for user instruction (step 2002). Thereafter, a command is executed by a user to print the cash journal history (step 2004). The process then locates all accounts related to the cash journal and locates all core components related to any accounts found (step 2006). The process then allocates memory to store information for the report, places the journal's name at the top of the page, uses the transaction ID value stored within each component to retrieve associated heading data, sorts and stores the components in memory, and organizes information for display (step 2008). Thereafter, the process sends the report to a printing or display device (step 2010). The process then returns to the journal report screens (step 2012).

The depicted embodiments are provided as examples and do not preclude other mechanisms for managing this relationship.

It is apparent from the foregoing description and drawings that the present invention facilitates a novel and more flexible system design for processing transactions and accounts without any loss of function.

The processes of the accounting system shown in FIGS. 3-14 may be implemented by those of ordinary skill in the art within the data processing system depicted in FIGS. 2A and 2B. The processes of the present invention also may be implemented in a program storage device that is readable by a data processing system, wherein the program storage device encodes data processing system executable instructions for the processes of the present invention. The program storage device may take various forms including, for example, but not limited to a hard disk drive, a floppy disk, an optical disk, a ROM, RAM, and an EPROM, which are known to those skilled in the art. The processes stored on a program storage device are dormant until activated by using the program storage device with the data processing system. For example, a hard drive containing data processing system executable instructions for the present invention may be connected to a data processing system; a floppy disk containing data processing system executable instructions for the present invention may be inserted into a floppy disk drive in the data processing system; or a ROM device containing data processing system executable instructions for the present invention may be connected to the data processing system via a card or adapter connected to an I/O slot.

The present invention allows for the storage and processing of the features of transactions that are common to many transaction types separate from those features specific to an particular type of transaction. The common information is stored in the core transaction files with the related specific information being stored in related auxiliary transaction files. The present invention extends this concept to accounts by storing and managing common account information in the core accounts file with the related specific information being stored in auxiliary accounts files.

The present invention facilitates the management of all journals according to a common and consistent design. By storing journals as records in the journals file, the accounting system of the present invention can be extended to include additional journals simply by adding new journal records as well as adding new data entry and management rules as these new journals may require. This general journal apparatus relates transactions automatically to all journals through the core accounts involved in the transaction. This obviates the need for special journals and journal procedures for each new or specific journal used by the system.

This design contrasts with earlier systems that have stored transactions in different files and managed different types of transactions using wholly different programs. It also contrasts with earlier systems that stored all transactions in a single file whose structure was so extensive as to contain all features of all transaction types. It also contrasts with earlier systems, based on manual accounting systems, that used different journals as a means of entering different types of transactions. These systems required different file structures and different journalizing procedures for each case.

The present invention facilitates a modular design wherein data and processes common to all transactions or accounts or journals can be developed, distributed and managed separately from data and processes specific to certain types of transactions or types of accounts or journals.

While the invention has been particularly shown and described with reference to a preferred embodiment, it will be understood by those skilled in the art that various changes in form and detail may be made therein without departing from the spirit and scope of the invention.

What is claimed is:

1. A method for enchancing a computer implemented accounting system for processing multiple transactions, the method comprising the computer implemented steps of:

(a) receiving a transaction comprising externally supplied data of which some is data that is specific to an accounting process;

(b) identifying a first portion of said externally supplied data and a second portion of said externally supplied data in response to receiving said transaction, wherein said first portion contains data specific to accounting processes and said second portion contains transaction specific data;

(c) associating said first portion of externally supplied data with said second portion of externally supplied data utilizing a unique transaction identifier, wherein said second portion manifests one data structure of a plurality of data structures, wherein said one data structure is identified as one transaction type of a plurality of transaction types, wherein said one transaction type corresponds to said one data structure, wherein said second portion is identified as corresponding to said one transaction type;

(d) storing said first portion of externally supplied data in a first data collection and storing said second portion of externally supplied data in one second data collection of a plurality of possible second data collections, wherein said one second data collection stores said second portions of data associated with said multiple transactions, wherein said one second data collection stores only said second portions of data identified as corresponding to said one transaction type;

(e) retrieving data from said plurality of data collections utilizing said unique transaction identifier and said transaction type, wherein data is more efficiently accessed, and programs for accessing data are more efficiently maintained within a computer implemented accounting system.

2. The method of claim 1, wherein all said first portions of the data have an identical data structure and are stored utilizing an identical data storage means.

3. The method of claim 1, wherein said first data collection includes a first storage means and a second storage means and further comprising:

(a) dividing said first portion into a header subportion and a components subportion, wherein said header subportion includes transaction data whose structure is common to all transactions, wherein said components subportion includes a plurality of components that contain accounts data affecting a plurality of accounts, wherein a number of said plurality of components may differ for each transaction, wherein said plurality of components may affect a different plurality of accounts for each transaction;

(b) storing said header subportion in a first storage means and storing said components subportion in a second storage means;

(c) associating said header subportion with said components subportion utilizing a unique identifier;

(d) retrieving data from said first and said second data storage means utilizing said unique identifiers; wherein data is more efficiently accessed, and programs for accessing data are more efficiently maintained within a computer implemented accounting system.

4. The method of claim 3, wherein in the plurality of components a number of accounts in said plurality of accounts may vary for each transaction and an identity of each account in said plurality of accounts is determined by said externally supplied data.

5. The method of claim 3, wherein said accounts data comprises values that affect one or more balances stored with each account.

6. The method of claim 3, wherein said accounts data contains a plurality of elements, wherein an element of said plurality of elements affects an account in said plurality of accounts, wherein said element comprises one or more amounts affecting balances in said account.

7. Method of claim 3, wherein all said plurality of components have an identical data structure and are stored utilizing an identical data storage means, wherein all said first portions of the data have an identical data structure and are stored utilizing an identical data storage means.

8. A method for enhancing a computer implemented accounting system for processing accounts, the method comprising the computer implemented steps of:

(a) receiving an account comprising externally supplied data of which some is data that is specific to the accounting process;

(b) identifying a first portion of said data and a second portion of said data in response to receiving said account, wherein said first portion contains data specific to the accounting process and said second portion contains account specific data;

(c) associating said first portion with said second portion utilizing a unique identifier, wherein said second portion manifests a data structure of a plurality of data structures, wherein said second portion's data structure is identified as one of a plurality of account types;

(d) storing said first portion of data in a first data collection and storing said second portion of data in one of a plurality of second data collections, wherein an identical second data collection is used for storing all said second portions of data of equal type;

(e) retrieving data from said plurality of data collections utilizing said unique identifier and said account type; wherein data is more efficiently accessed, and programs for accessing data are more efficiently maintained within a computer implemented accounting system.

9. The method of claim 8, wherein all of said first portions of the data have an identical data structure and are stored utilizing an identical data storage means.

10. The method of claim 8, wherein said first data collection includes a first storage means and a second storage means and further comprising:

(a) dividing said first portion of the data into an account subportion and a components subportion, wherein said account subportion includes account data whose structure is common to all accounts, wherein said components subportion includes a plurality of components that contains transaction data affecting a plurality of transactions, wherein said account subportion is associated with said components subportion utilizing a unique account identifier;

(b) storing said account subportion in said first storage means and storing said components subportion in said second storage means, wherein a number of said plurality of transactions may differ for each account, wherein said components may affect a different plurality of transactions for each account, wherein a set of all components affecting all accounts in said first data collection constitutes a complete set of components, wherein one subset of components of said complete set that affect an identical transaction always exists, wherein components of said one subset are said transaction's components and are associated with each other utilizing a unique transaction identifier;

(c) retrieving data from said first and said second storage means utilizing unique account identifiers and unique transaction identifiers; wherein data is more efficiently accessed, and programs for accessing data are more efficiently maintained within a computer implemented accounting system.

11. The method of claim 10, wherein said transactions data contained in said plurality of components comprises one or more amounts affecting balances in said accounts, wherein said amounts associated with said transaction components are subject to a balancing condition imposing one or more constraints upon said amounts.

12. The method of claim 10, wherein said plurality of components is determined by said externally supplied information.

13. A data processing system for more efficiently utilizing journals to manage accounts comprising:

(a) account receiving means for receiving an account comprising externally supplied account information of which some information is specific to an accounting process;

(b) first storage means of storing said account in an accounts collection;

(c) journal receiving means for receiving a journal comprising externally supplied information;

(d) second storage means for storing said journal in a journals collection, wherein said externally supplied account information specifies a journal from said journals collection that is associated with said account;

(e) association means for associating said account with said journal utilizing a unique journal identifier, wherein each account in said accounts collection is associated with one journal in said journals collection, wherein each journal in said journals collection is associated with one or more accounts in said accounts collection, wherein said externally supplied account information specifies one or more account balances, wherein said externally supplied account information specifies an account type from a plurality of account types, wherein there is a type rule that limits which accounts may be associated with said journals based on said account's type;

(f) rule application means for applying said type rule so that said accounts collection only contains accounts that conform to said rule;

(g) retrieval means for retrieving accounts data from said accounts collection such that said accounts data is related to a subset of journals from said journals collection, wherein account balances can be more easily reviewed, and programs for accessing data are more efficiently maintained within a computer implemented accounting system.

14. The data processing system of claim 13 comprising:

(a) transaction receiving means for receiving a transaction that affects a plurality of account balances;

(b) third storage means for storing said transaction in a transactions collection, wherein there is a transaction rule that imposes a general condition that applies to all transactions, wherein said transaction rule limits effects said transaction can have upon said plurality of account balances;

(c) application means for applying said transaction rule so that said transactions collection only contains transactions that conform to said rule;

(d) retrieval means for retrieving transactions data associated with those transactions that affect balances of a subset of accounts in said accounts collection.

15. The method of claim 13, wherein said account information includes a specification of a general ledger account that is associated with said account, wherein said general ledger account is one of a plurality of general accounts.

* * * * *